US011988993B2

(12) United States Patent
Forsey et al.

(10) Patent No.: US 11,988,993 B2
(45) Date of Patent: May 21, 2024

(54) TIMEPIECE ESCAPEMENT MECHANISM

(71) Applicants: COMPLITIME SA, La Chaux-de-Fonds (CH); GFPI SA, La Chaux-de-Fonds (CH)

(72) Inventors: Stephen Forsey, Les Brenets (CH); Robert Greubel, Le Locle (CH); Fabrice Deschanel, Villers-le-Lac (FR); Christophe Zwahlen, Les Brenets (CH); Florian Corneille, Mathay (FR)

(73) Assignees: COMPLITIME SA, La Chaux-de-Fonds (CH); GFPI SA, La Chaux-de-Fonds (CH)

( * ) Notice: Subject to any disclaimer, the term of this patent is extended or adjusted under 35 U.S.C. 154(b) by 715 days.

(21) Appl. No.: 17/256,687

(22) PCT Filed: Jun. 20, 2019

(86) PCT No.: PCT/EP2019/066323

§ 371 (c)(1),
(2) Date: Dec. 29, 2020

(87) PCT Pub. No.: WO2020/007619

PCT Pub. Date: Jan. 9, 2020

(65) Prior Publication Data

US 2021/0141340 A1 May 13, 2021

(30) Foreign Application Priority Data

Jul. 2, 2018 (EP) .................................... 18181276
Nov. 29, 2018 (EP) .................................... 18209214

(51) Int. Cl.

*G04B 15/10* (2006.01)
*G04B 15/02* (2006.01)
*G04B 15/14* (2006.01)

(52) U.S. Cl.

CPC ............ *G04B 15/10* (2013.01); *G04B 15/02* (2013.01); *G04B 15/14* (2013.01)

(58) Field of Classification Search

CPC ......... G04B 15/10; G04B 15/02; G04B 15/14

(Continued)

(56) References Cited

U.S. PATENT DOCUMENTS 3,704,582 A 12/1972 Wuthrich
2008/0259738 A1 10/2008 Jurin (Continued)

FOREIGN PATENT DOCUMENTS

CH 712013 7/2017
CH 712052 7/2017

(Continued)

*Primary Examiner* — Edwin A. Leon
*Assistant Examiner* — Kevin Andrew Johnston
(74) *Attorney, Agent, or Firm* — DUANE MORRIS LLP; Gregory M. Lefkowitz

(57) ABSTRACT

Disclosed is an escapement mechanism (1) for a timepiece, designed to cooperate with an oscillator arranged to carry out oscillations, said mechanism (1) comprising:—a count wheel (7) arranged for step-wise forward rotation depending on the oscillations of the oscillator;—an impulse wheel (11) designed to be kinematically linked to a power source, said impulse wheel (11) being arranged to be periodically blocked and released under the control of the count wheel (7) and to supply impulses to the oscillator, characterized in that:—when said escapement mechanism (1) is operating, the count wheel (7) is continuously subjected to a torque;—and the count wheel (7) is arranged to rotate forward by one half-step of its toothing for every vibration of the oscillator.

20 Claims, 13 Drawing Sheets

(58) Field of Classification Search
USPC .......................................................... 368/125
See application file for complete search history.

(56) References Cited

U.S. PATENT DOCUMENTS

| | | | |
|---|---|---|---|
| 2012/0113764 | A1 | 5/2012 | Queval |
| 2012/0250467 | A1 | 10/2012 | Bas |

FOREIGN PATENT DOCUMENTS

| | | | | | |
|---|---|---|---|---|---|
| CH | 712084 | | | 7/2017 | |
| CN | 106707718 | A | * | 5/2017 | ............. G04B 15/14 |
| EP | 2660661 | | | 11/2013 | |
| EP | 3070537 | | | 9/2016 | |
| EP | 3070537 | A1 | * | 9/2016 | |
| EP | 3121661 | A1 | * | 1/2017 | ............. G04B 15/08 |
| EP | 3206088 | | | 8/2017 | |
| EP | 3293583 | A1 | * | 3/2018 | ............. G04B 15/06 |
| WO | 2004008258 | | | 1/2004 | |
| WO | 2017125194 | | | 7/2017 | |
| WO | 2018046563 | | | 3/2018 | |

* cited by examiner

TIMEPIECE ESCAPEMENT MECHANISM

CROSS-REFERENCE TO RELATED APPLICATIONS

This application is a § 371 national stage entry of International Application No. PCT/EP2019/066323, filed on Jun. 20, 2019, which claims priority to European Patent Application No. 18181276.9, filed on Jul. 2, 2018, and European Patent Application No. 18209214.8, filed Nov. 29, 2018, the entire contents of which are incorporated herein by reference.

TECHNICAL FIELD

The present invention relates to the field of horology. It relates more particularly to an escapement mechanism.

STATE OF THE ART

The Swiss anchor escapement associated with a spring-balance oscillator has become the regulating system most commonly used these days. It is simple, reliable, resistant to shocks, and is well mastered by horologists. However, it is not without defects, notably in terms of energy efficiency and with respect to its isochronism. Indeed, the interaction on each alternation of the balance between the escapement wheel and the anchor, as well as the shocks generated waste a lot of energy. Furthermore, the drawing of the anchor upon release also generates a significant disturbance of the oscillations of the balance. Indeed, the use of an anchor to both trigger an impulse and to transmit it to the balance is not optimal.

The detent escapement represents an improvement in efficiency and isochronism, the detent lever being actuated once per oscillation and the impulse being supplied directly by the escapement wheel to an impulse pallet rotationally secured to the balance. The balance is thus disturbed by the impulse once per oscillation instead of on each alternation, and this disturbance is less great than in the case of the Swiss anchor. In essence, the resistance imparted by the detent lever is less than that of the anchor because the impulse is given directly by the escapement wheel instead of being transmitted by an anchor or the like, which engenders a lesser energy consumption. The efficiency of the escapement and power reserve of the movement are thus enhanced.

The document CH712052 describes a particular single-beat escapement. The balance bears a one-way drive system which drives, once per oscillation, a counting wheel at a rate of one step per actuation. This counting wheel is positioned by a jumper, and comprises a cam which, once per n steps of the counting wheel, lifts a blocking lever which retains an impulse wheel. The latter is thus free to pivot to give an impulse directly to the balance and is blocked again by the blocking lever until the next actuation.

However, the presence of a one-way drive system mounted rotationally secured to the balance presents difficulties with respect to its adjustment and with regard to the balancing of the balance. In effect, this arrangement is not very, or not at all, compatible with conventional balances. Moreover, the use of a jumper to position the counting wheel offers a low resistance to shock and can be improved with respect to the resistance offered to the balance in the driving of said wheel.

The aim of the invention is consequently to propose an escapement for a timepiece in which the abovementioned defects are at least partially overcome.

DISCLOSURE OF THE INVENTION

More specifically, the invention relates to an escapement mechanism for a timepiece, as defined by claim 1.

This escapement mechanism is, of course, intended to cooperate with an oscillator arranged to perform oscillations, such as, for example, a spring-balance oscillator, comprising an inertial mass (typically called a "balance"), arranged so as to carry out oscillations in rotation about its axis of rotation under the effect of a return force supplied by an elastic element such as a hairspring.

Said mechanism comprises:

- a counting wheel arranged to advance in rotation by discrete steps in function of the oscillations of said oscillator;
- an impulse wheel intended to be kinematically linked with a motive source such as a barrel housing a mainspring, said impulse wheel being arranged to be blocked and released periodically under the direct or indirect control of said counting wheel, that is to say in function of its rotation and thus its angular position and also to supply impulses to said oscillator. In other words, it is the rotational movements of the counting wheel which result in the release of the impulse wheel, and which thus trigger its periodic rotations.

According to the invention, when said system is operating, the counting wheel is permanently subjected to a torque, for example under the effect of an elastic element which directly or indirectly exerts a force in the direction of the direction of rotation of the counting wheel at all times, and said counting wheel is arranged to advance in rotation by one half-step of its toothing per alternation of said oscillator.

By these means, the disturbance of the oscillations of the oscillator is minimized for two reasons. Firstly, no jumper or pawl is needed to retain the counting wheel since the latter is permanently subjected to a torque and can therefore be blocked by one or more pallets or the like. This torque ensures the rotational driving of the counting wheel, which is not therefore performed by a one-way drive system rotationally secured to the oscillator—the sole effect of the oscillator being to release the counting wheel instead of driving it. It goes almost without saying that a releasing of the wheel requires less force than a direct drive, which disturbs the oscillator less. Moreover, this reduced disturbance is divided between the two opposing alternations of the oscillator instead of being concentrated in one of the two. The disturbance is therefore rather divided symmetrically between the two alternations instead of representing one great disturbance due to an actuation of one wheel in one alternance of every two. Since the disturbance of the oscillator is thus minimized, its isochronism is enhanced, while the excellent power reserve allowed by a single-beat escapement is retained.

Advantageously, the mechanism comprises a first blocking lever arranged to move between a first angular position and a second angular position upon a first alternation of said oscillator, and to move between said second angular position and said first angular position upon a second alternation of said oscillator, said blocking lever being arranged to block the rotation of said counting wheel and to release the latter for one half-step of its toothing upon each of said movements of said first blocking lever.

Advantageously, the mechanism further comprises a second blocking lever arranged to block and release said impulse wheel in function of the rotation of said counting wheel. To this end, said second blocking lever can be arranged to release said impulse wheel for one step of its toothing on each n alternations of said oscillator, n being a number greater than two and, preferably, an even number, and even more preferentially equal to four or to six.

Advantageously, the second blocking lever comprises a cam follower arranged to cooperate with at least one cam or at least one cam track rotationally secured to said counting wheel. The follower can be, for example, a catch, a pin, a fork or the like which can be monobloc with said cam wheel or can be added to the latter or be composed of an element rotationally secured to the counting wheel. It is for example possible to provide several distinct cams, one continuous cam or one continuous cam track which cooperates with a cam follower of appropriate form for the shape chosen for the cam. It should be noted that the term “cam” should be understood in the broad sense, a cam thus being able not only to have a conventional form but also to have a form of particular toothing, pins or catches, successions of pins or catches forming a path, a spline, etc., or any other element exerting a cam action.

Advantageously, said second blocking lever comprises at least one pallet arranged to block and release (in due course) said impulse wheel. This pallet can be made of stone or the like or can be monobloc with said lever.

Advantageously, said second blocking lever comprises a single pallet arranged to block and to release said impulse wheel, said second blocking lever being arranged to be lifted by an actuation lever in order to release said impulse wheel. This actuation lever is arranged to move in translation between a retracted position in which said actuation lever is out of reach of an actuation pallet rotationally secured to said oscillator and an active position in which said actuation lever can cooperate with said actuation pallet to lift said second blocking lever. The state of said actuation lever, that is to say whether it is in an active position or a retracted position, is determined in function of the angular position of said counting wheel. In this embodiment, the releasing of the impulse wheel is thus controlled by the counting wheel and triggered by the actuation pallet.

Advantageously, said actuation lever is arranged to move between said active position and said retracted position under the effect of a control lever bearing a cam follower arranged to cooperate with a cam track or cams rotationally secured to said counting wheel.

Advantageously, said torque, to which said counting wheel is subjected, is supplied via an elastic element armed directly or indirectly by the impulse wheel. Said torque thus remains substantially constant when the mechanism is operating, the elastic element being recharged each time the impulse wheel is moved angularly.

Advantageously, said elastic element forms part of a recharge assembly comprising a wheel kinematically linked with said counting wheel. A first end of said elastic element can thus be fixed to said wheel and a second end of said elastic element is rotationally secured to a recharge wheel arranged to be driven in rotation by a toothing of said impulse wheel.

Advantageously, said recharge wheel is arranged to be retained by a retention lever arranged to block a rotation of said recharge wheel in a first direction and to be lifted by a tooth of said recharge wheel when the latter pivots in a second direction, opposite to said first direction.

Advantageously, said retention lever is arranged to cooperate with a plurality of abutments provided on said impulse wheel, said abutments being arranged to prevent said retention lever from being released, except when said recharge wheel is being driven by said impulse wheel. The retention lever is thus protected from shocks and no unwanted release of the impulse wheel is possible.

Advantageously, said impulse wheel and said recharge wheel each comprise a plurality of teeth distributed between at least two different planes, each tooth of a first plane being situated angularly between two angularly adjacent teeth of the other plane or planes.

Advantageously, a first end of said elastic element is rotationally secured to said impulse wheel and a second end of said elastic element is rotationally secured to a wheel kinematically linked with said counting wheel. This construction is notably very compact and requires no separate recharge wheel.

Advantageously, said second blocking lever comprises a single blocking pallet arranged to block the impulse wheel and a cam follower arranged to cooperate with at least one cam that said counting wheel comprises, said counting wheel comprising a plurality of abutments arranged to prevent said second blocking lever from releasing said impulse wheel except when said cam follower is being actuated by said at least one cam. This arrangement of abutments protects the second blocking lever from shocks, preventing it from being lifted except when it is actuated by said at least one cam.

Advantageously, the impulse wheel and the counting wheel are each pivoted about their own axis of rotation, each of these axes being distinct from the other, which allows the escapement to be made compact height-wise.

Said mechanism can be incorporated in a timepiece movement comprising a mechanism as claimed in one of the preceding claims and an oscillator arranged to cooperate with said mechanism, this movement being able to be incorporated in a timepiece.

BRIEF DESCRIPTION OF THE DRAWINGS

Other details of the invention will become clearly apparent upon reading the following description, with reference to the attached drawings in which.

EMBODIMENTS OF THE INVENTION

Figure 1:
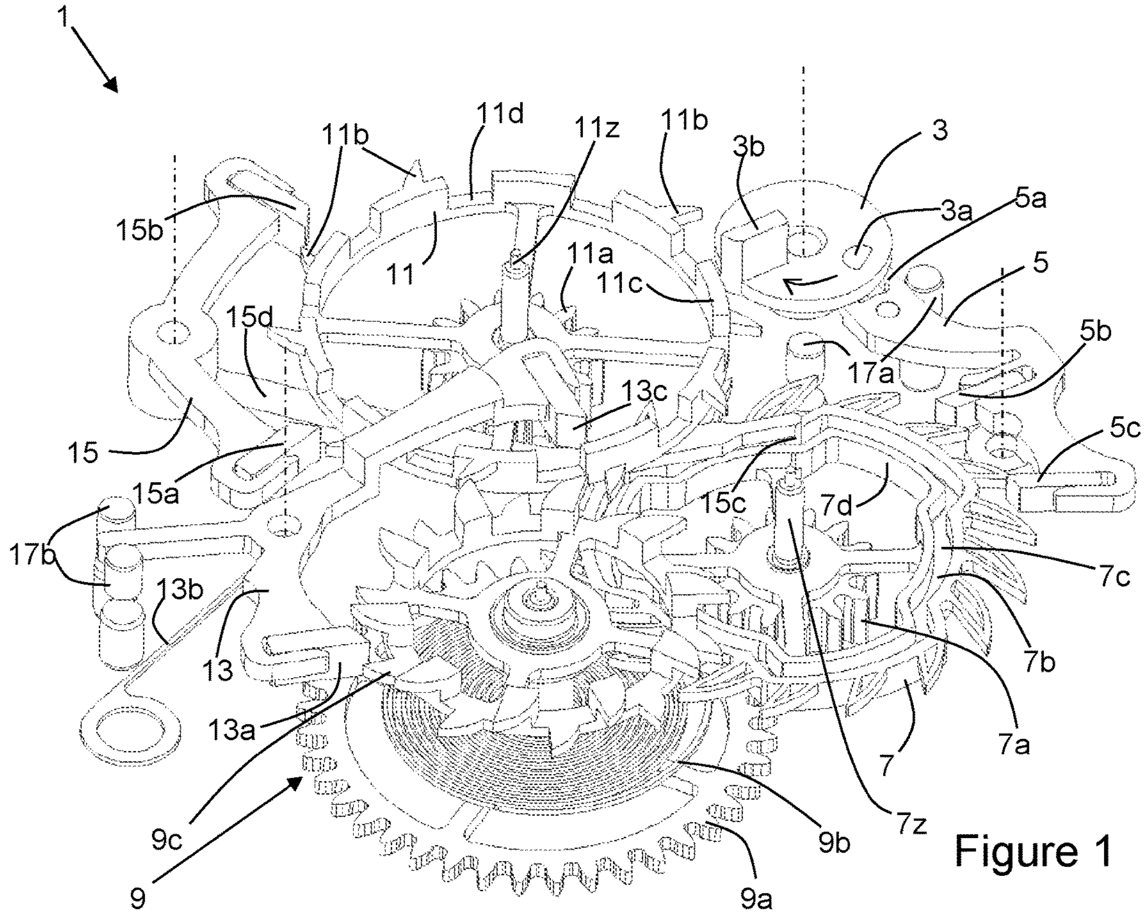
FIGS. 1 to 10 are isometric representations of a first embodiment of an escapement according to the invention, in several of its operating phases.

FIG. 1 illustrates a first embodiment of an escapement mechanism 1 according to the invention.

The escapement 1 cooperates with a spring-balance oscillator, of which only the table roller 3 has been represented so as not to overload the drawings and whose axis of rotation has been represented by a vertical chain-dotted line. This table roller 3, and the spring-balance to which it is rotationally secured, can be of conventional form, but other known variants (for example balances without felloes, high-frequency or the like) are also possible. The table roller comprises a roller pin 3$a$ and an impulse pallet 3$b$, which can alternatively be mounted directly on the balance. These components each have a conventional form, the roller pin 3$a$ being used to make a first blocking lever 5 pivot by means of a fork 5*a* that the latter comprises. It will be noted that it is also possible for the table roller 3 to be composed of several parts, for example in order to be able to regulate the angular position of one or other of the roller pin 3*a* and of the impulse pallet 3*b* with respect to the table roller 3, and to do so without influencing the position of the other.

Said fork 5*a* is well known in the context of the Swiss anchor escapement. It cooperates with the roller pin 3*a* once per alternation in order to move the first blocking lever 5 from a stable first angular position (illustrated in FIG. 1), to a stable second angular position (illustrated in FIG. 2) upon an alternation of the balance in a first direction (clockwise according to the orientation represented in FIG. 1) and in the other direction upon the alternation of the balance in the other direction (counter-clockwise according to the orientation of FIG. 1). The extreme angular positions of the first blocking lever are defined by conventional abutments 17*a*, disposed on either side of an arm of said lever 5.

The first blocking lever 5 comprises a pair of pallets 5*b*, 5*c*, which cooperate with a counting wheel 7, which is pivoted about a corresponding axis of rotation 7*z* and which is subjected to a torque tending to drive it in the clockwise direction (according to the orientation of FIG. 1) when the escapement operates. When the first blocking lever 5 is in its first angular position (see FIG. 1), the exit-pallet 5*c* blocks one tooth of the counting wheel 7, and, when said lever 5 is in its second angular position, the entry-pallet 5*b* in turn blocks another tooth of the counting wheel 7. That way, upon each alternation of the balance, the counting wheel 7 advances by one half-step of its toothing, one entire step being performed upon a complete oscillation, which by definition is composed of two successive alternations. Although the pallets 5*a*, 5*b* have been represented here as pallets made of stone fixed to the first blocking lever 5, they can alternatively be monobloc therewith. Indeed, the term “pallet” means rather a functional element integrated with the lever 5 instead of a distinct element added thereto, which equally applies also to any pallet mentioned in the present text.

In order to supply torque to ensure the advancing of the counting wheel 7, the escapement mechanism 1 comprises, in addition, a recharge assembly 9, which comprises a wheel 9*a* kinematically linked with the counting wheel 7 by a pinion 7*a* rotationally secured thereto. Coaxial to said wheel 9*a* there is a recharge wheel 9*c* and an elastic element 9*b*, one of the ends of which is fixed to said wheel 9*a* and the other end of which is fixed to the recharge wheel 9*c*. The wheel 9*a* can pivot with respect to the recharge wheel 9*c*, and, when the mechanism 1 is at rest, the elastic element is subjected to a prestress. The counting wheel 7 is thus subjected to a torque at all times, this torque being supplied by the elastic element 9*b* and tending to drive the counting wheel 7 in its direction of rotation. Note that the elastic element 9*b* as represented is a hairspring, but other forms are also possible, such as, for example, a leaf spring or any other elastic element known to the person skilled in the art.

In this embodiment, the recharge wheel 9*c* is driven by the impulse wheel 11, as explained below, and is prevented from pivoting in the wrong direction by a retention lever 13, the extreme angular positions of which are defined by suitable abutments 17*b*. This retention lever 13 comprises a blocking pallet 13*a* which, at rest, cooperates with a straight flank of a tooth of the recharge wheel 9*c*. When the recharge wheel 9*a* is pivoted in the counter-clockwise direction (with respect to FIG. 1) by a tooth of the impulse wheel 11, the blocking pallet 13*a* is lifted by the curved flank of the next tooth, as described below.

The impulse wheel 11 is pivoted about its own axis of rotation 11*z*, and is driven by a power source such as a barrel, the force arriving on its pinion 11*a* to which it is rotationally secured. This pinion 11*a* thus serves as torque input for the mechanism 1.

The impulse wheel 11 comprises a plurality of impulse teeth 11*b*, arranged on two rows on two different levels of the impulse wheel 11, the teeth of one row being interposed angularly between those of the other with constant angular separations. These teeth cooperate with the impulse pallet 3*b*, which has a sufficient height to cooperate with both rows. Note also that an arrangement of the teeth 11*b* in a single plane is also possible, but the chosen configuration makes it possible to avoid having angularly adjacent teeth come accidentally into contact with other elements, for example, in the driving of the recharge wheel 9*c*. In addition, the teeth can also be arranged on more than two rows on more than two different levels, the teeth of the recharge wheel 9*c* being obviously arranged to cooperate correctly with the rows of teeth of the impulse wheel.

The impulse wheel 11 is blocked by a second blocking lever 15, which comprises a pair of pallets 15*a* and 15*b* arranged to block the teeth 11*b* of the impulse wheel 11 and to release them one by one when the blocking lever 15 is moved from one of its stable angular positions to the other, in a conventional manner. In this embodiment, the second blocking lever 15 therefore takes the form of an anchor, and the same comments as given above in the context of the pallets 5*b* and 5*c* apply to the pallets 15*a* and 15*b*.

The angular movement of the second blocking lever 15 to effect the releasing of the impulse wheel 11 is controlled by the counting wheel 7, which comprises a cam track 7*b*. The latter comprises sections with smaller radius 7*c* and sections with greater radius 7*d*, regularly angularly distributed, A cam follower 15*c*, in the form of a pin, is borne by an arm 15*d* of the second blocking lever 15 and is positioned in this cam track 7*b*. The latter is conformed to control the second blocking lever 15 in order to release the impulse wheel once per n oscillations of the balance upon the transition from a section with smaller radius 7*c* to a second with greater radius 7*d*, and vice versa. In the embodiment illustrated, n is three, and, consequently, the radius of the cam track changes every three teeth of the counting wheel, but it can in principle change more or less frequently. Because of this, after the passage of three teeth (that is to say following six alternations of the balance), the second blocking lever 15 changes angular position from one of its extreme positions to the other and one of the teeth 11*b* of the impulse wheel 11 cooperates with the impulse pallet 3*b* in order to transmit an impulse to the oscillator. Alternatively, the counting wheel 7 can comprise a conventional cam, a cam follower borne by the second blocking lever 15 being kept in contact with said cam by a suitable elastic element. Also alternatively, the counting wheel 7 can comprise a constant radius cam, the second blocking lever 15 having a fork whose two arms follow said cam.

Before being blocked again by one of the pallets 15*a*, 15*b* of the second blocking lever 15, one of the teeth 11*b* of the impulse wheel cooperates with a tooth of the recharge wheel 9*c* in order to drive it by one step of its toothing, the latter also comprising two rows of teeth arranged in two different planes in order to be able to cooperate with the toothing with two rows of the impulse wheel. Because of this, the retention lever 13 is lifted by the curved flank of a tooth, then drops back into the trajectory of the next tooth under the effect of a return spring 13*b* in order to block the recharge wheel 9*c* again.

In order to protect the retention lever 13 from shocks, it also comprises a security pallet 13*c*, which is situated inside the impulse wheel 11. The latter comprises a plurality of abutments 11*c* that protrude from its feline in a direction parallel to the axis of rotation of the wheel 11. These abutments 11*c* are used to prevent the retention lever 13 from being lifted except during the driving of the recharge wheel 9*c*. To this end, the abutments 11*c* are arranged to block the security pallet 13*c*, and interstices 11*d* separating said abutments 11*c* are positioned to allow the passage of this security pallet 13*c* exclusively at the moment of driving of the recharge wheel 9*c*. Because of this, the retention lever 13 is prevented from being moved angularly accidentally, for example following a shock. Even though the abutments 11*c* and the interstices 11*d* have been illustrated as being monobloc with the impulse wheel 11, they can also be defined by one element (or even several elements) added to the latter.

The construction and the general principle of operation of the escapement of FIG. 1 having been described, the phases of its operation will now be explained in more detail. Subsequently, only the reference signs mentioned in the text in the context of a particular figure will be reproduced on the figure in question.

FIG. 1 illustrates the positions of the components upon a first alternation of the oscillation in the direction indicated. The counting wheel 7 is blocked by the exit-pallet 5*c* of the first blocking lever 5, which is in its first angular position. The table roller 3 is being pivoted in the clockwise direction (relative to FIG. 1) and the roller pin 3*a* enters into the fork 5*a* of the first blocking lever 5. The pin 15*c* of the second blocking lever 15 is at the start of a section with smaller radius of the cam track 7*b* and the impulse wheel 11 is blocked by the exit-pallet 15*b* of the second blocking lever 15.

Figure 2:
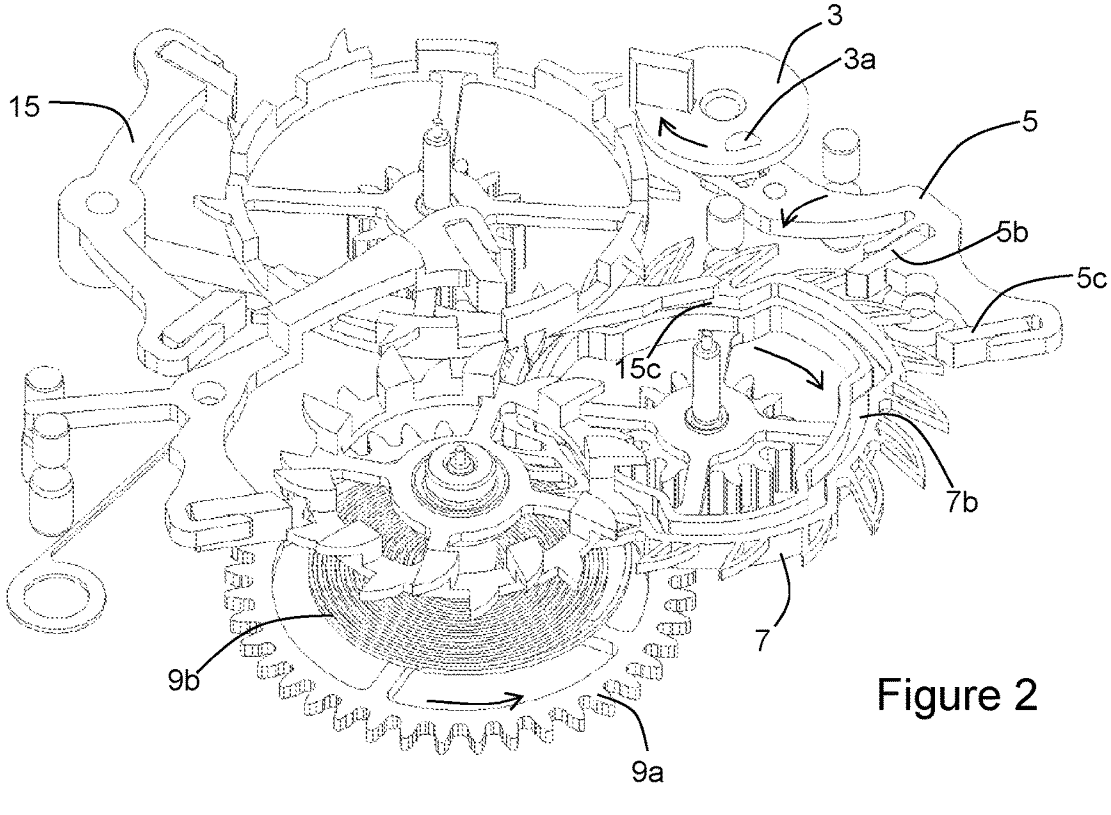

In FIG. 2, the table roller 3 has pivoted to the point where the first blocking lever 5 has arrived in its second angular position after having pivoted in the counter-clockwise direction (relative to FIG. 2). This change of angular position has released the counting wheel, which is pivoted by one half-step of its toothing under the effect of the elastic element 9*b*, and has been blocked again by the entry pallet 5*b* of the first blocking lever 5. The pin 15*c* of the second blocking lever remains in the same section with smaller radius of the cam track 7*b*, and the rest of the mechanism thus remains in the same state.

Figure 3:
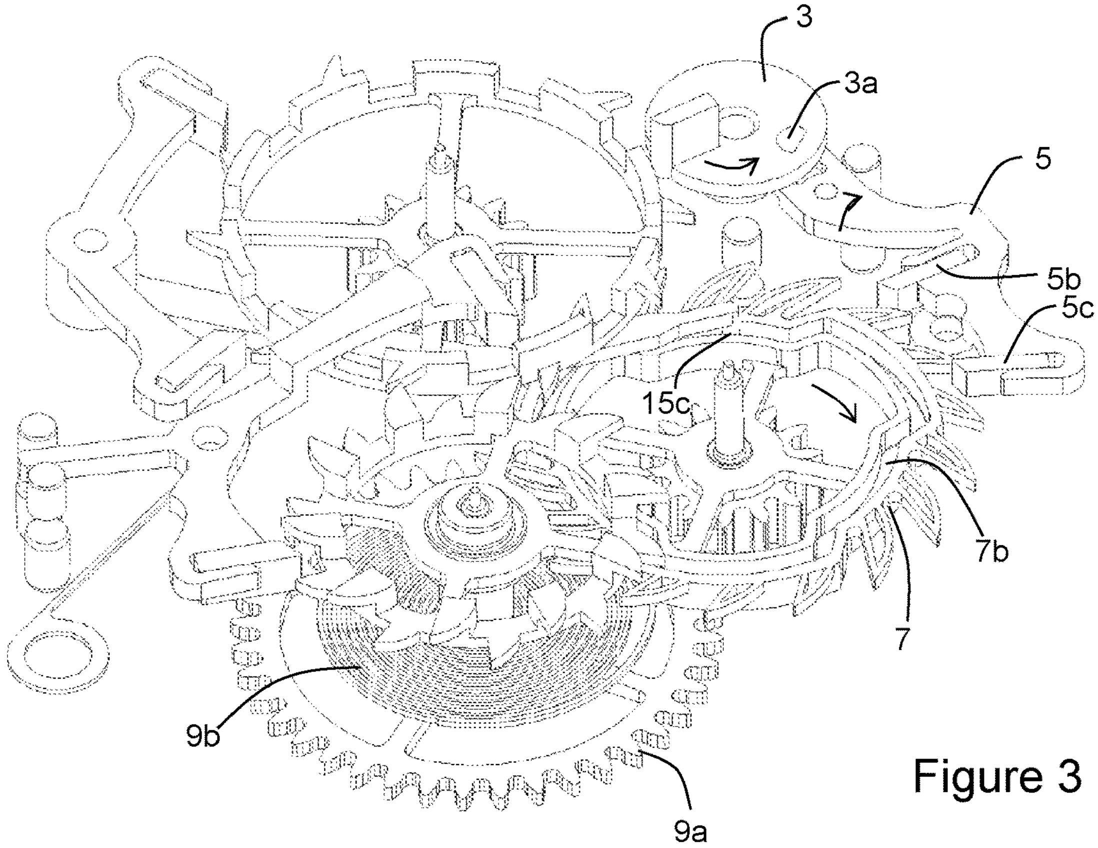

FIG. 3 illustrates the situation upon the next alternation, in the counter-clockwise direction (relative to FIG. 3), after actuation of the first blocking lever 5 by the roller pin 3*a*. Once again, the change of angular position of the first blocking lever 5 from its second angular position to its first angular position releases the counting wheel 7 again by one half-step under the effect of the elastic element 9*b*, the counting wheel 7 being blocked once again by the exit-pallet 5*c* of the first blocking lever 5. Thereby, the pin 15*c* of the second blocking lever remains in the same section with smaller radius of the cam track 7*b*, and the rest of the mechanism thus remains in the same state.

The cycle continues until the pin 15*c* reaches the end of the section with smaller radius of the cam track 7*b*, which occurs on the sixth alternation counted from the state illustrated in FIG. 1.

Figure 4:
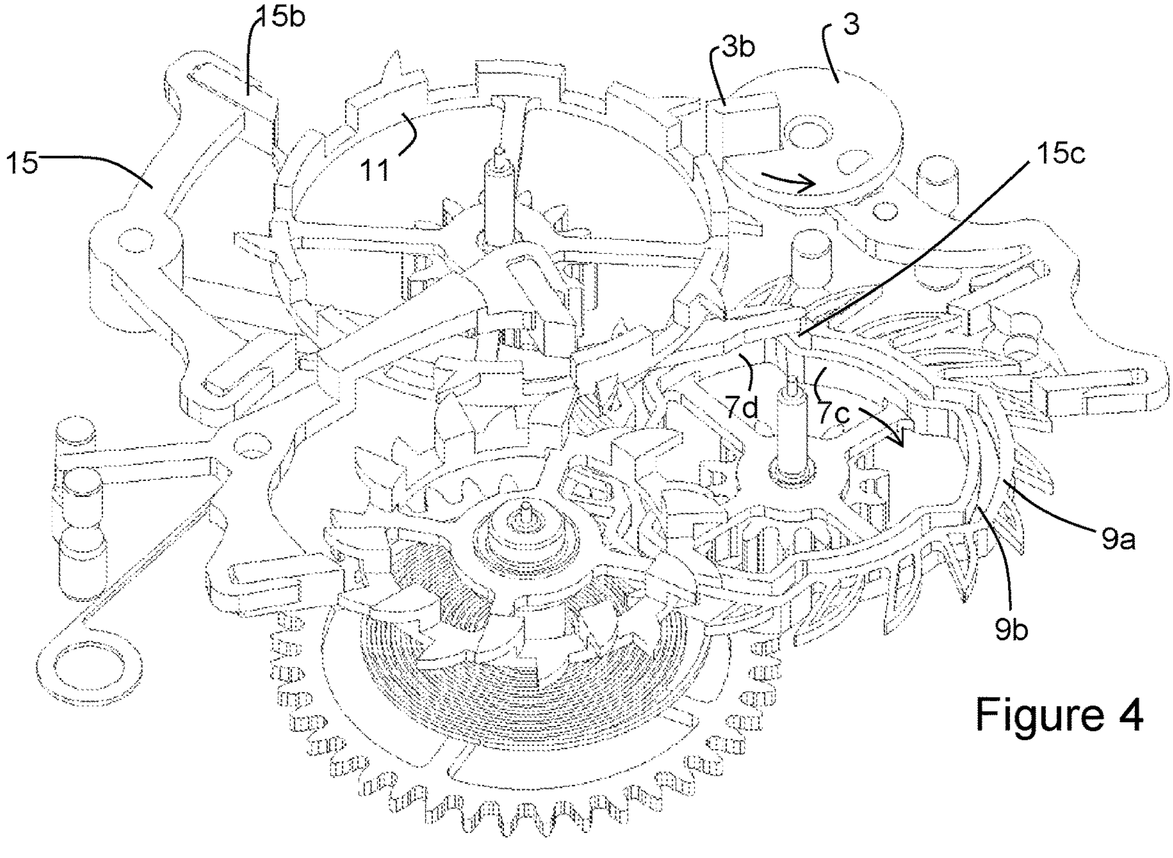

The moment of disengagement of the counting wheel 7 upon the sixth alternation is illustrated in FIG. 4.

The counting wheel 7 has pivoted and the pin 15*c* of the second blocking lever 15 rises toward the next section of the cam track 7*b*, with greater radius 7*d*.

This transition of sections has caused the second disengaging lever 15 to pivot, which has lifted its exit-pallet and has released the impulse wheel.

Figure 5:
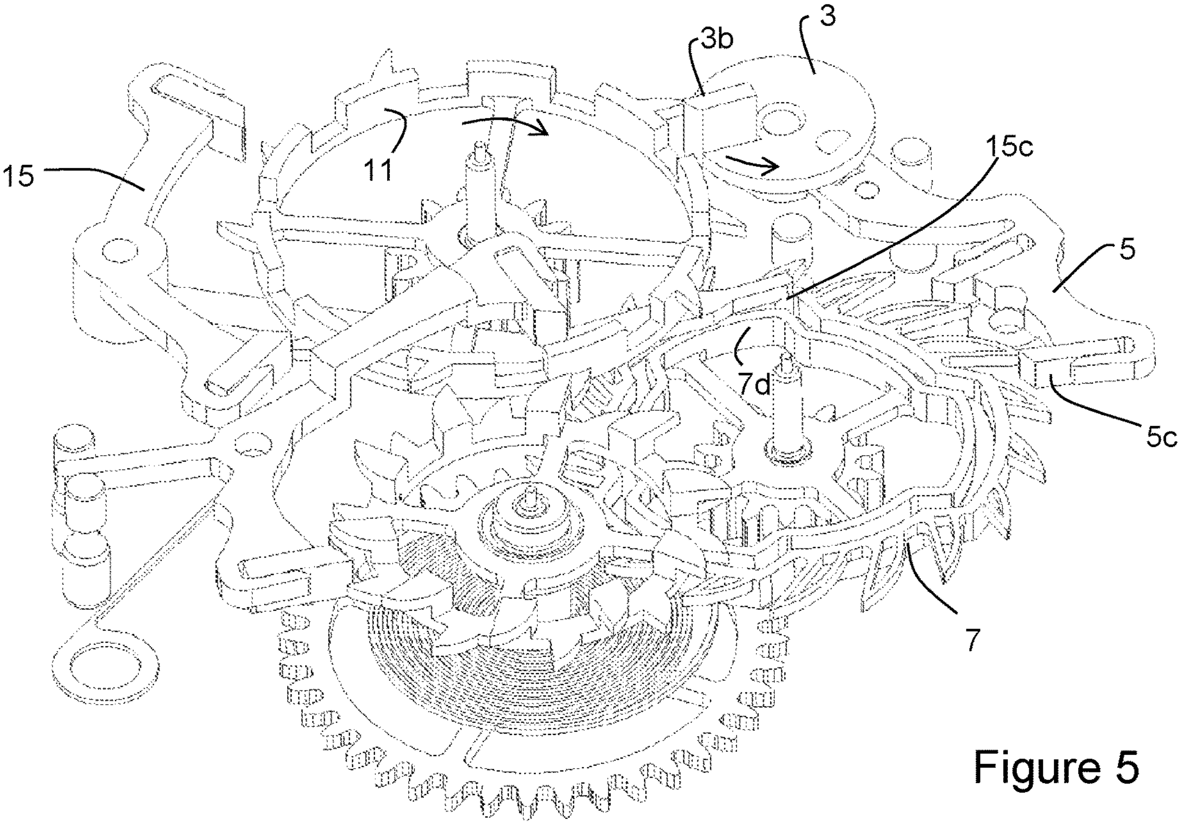

In FIG. 5, the pin 15*c* has finished rising in the section with greater radius 7*d* and the exit-pallet 5*c* of the first blocking lever 5 has blocked the next tooth of the counting wheel 7, which has caused it to be stopped.

Simultaneously, a tooth of the impulse wheel 11 catches the impulse pallet 3*b* and begins to give an impulse thereto.

Figure 6:
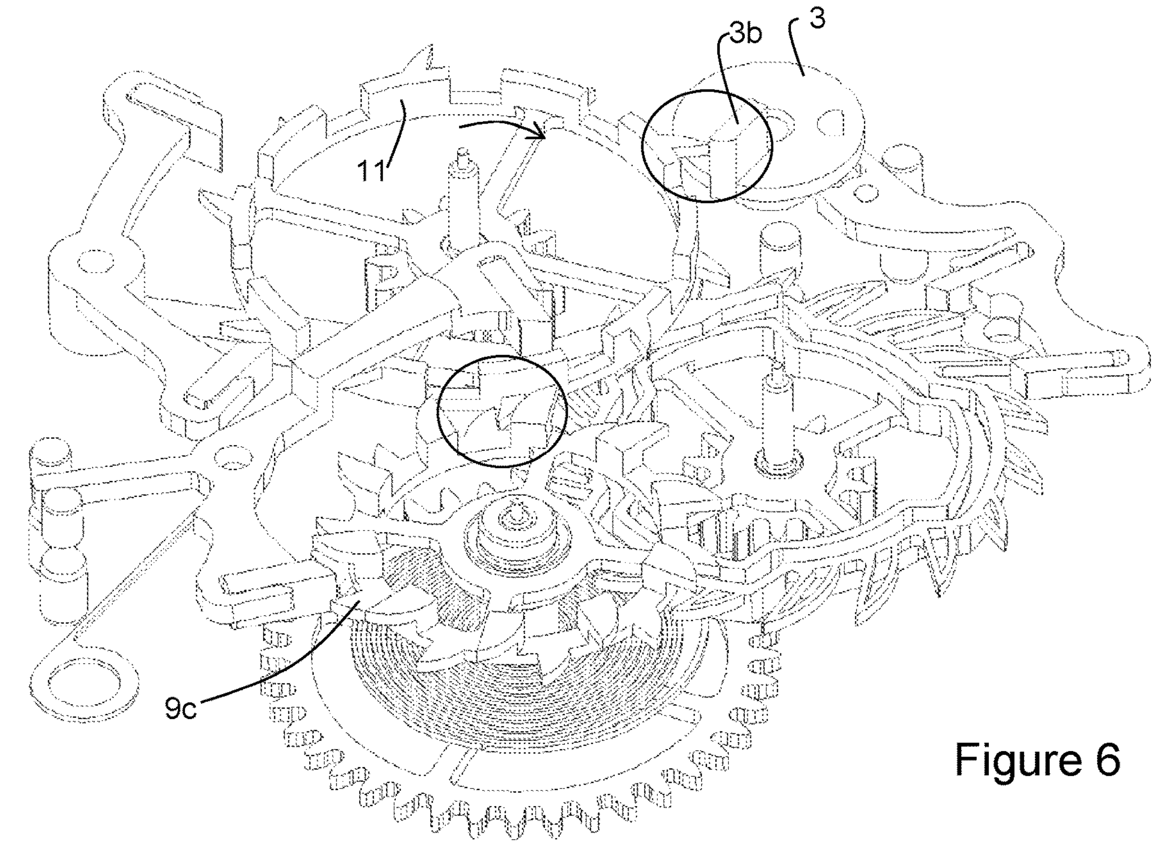

FIG. 6 illustrates the state of the components at the end of the impulse, just before the contact between the impulse pallet 3*b* and the corresponding tooth of the impulse wheel 11 is broken. At the same time, another tooth of the impulse wheel enters into contact with the straight face of a tooth of the recharge wheel 9*c*, as indicated by the corresponding oval.

Figure 7:
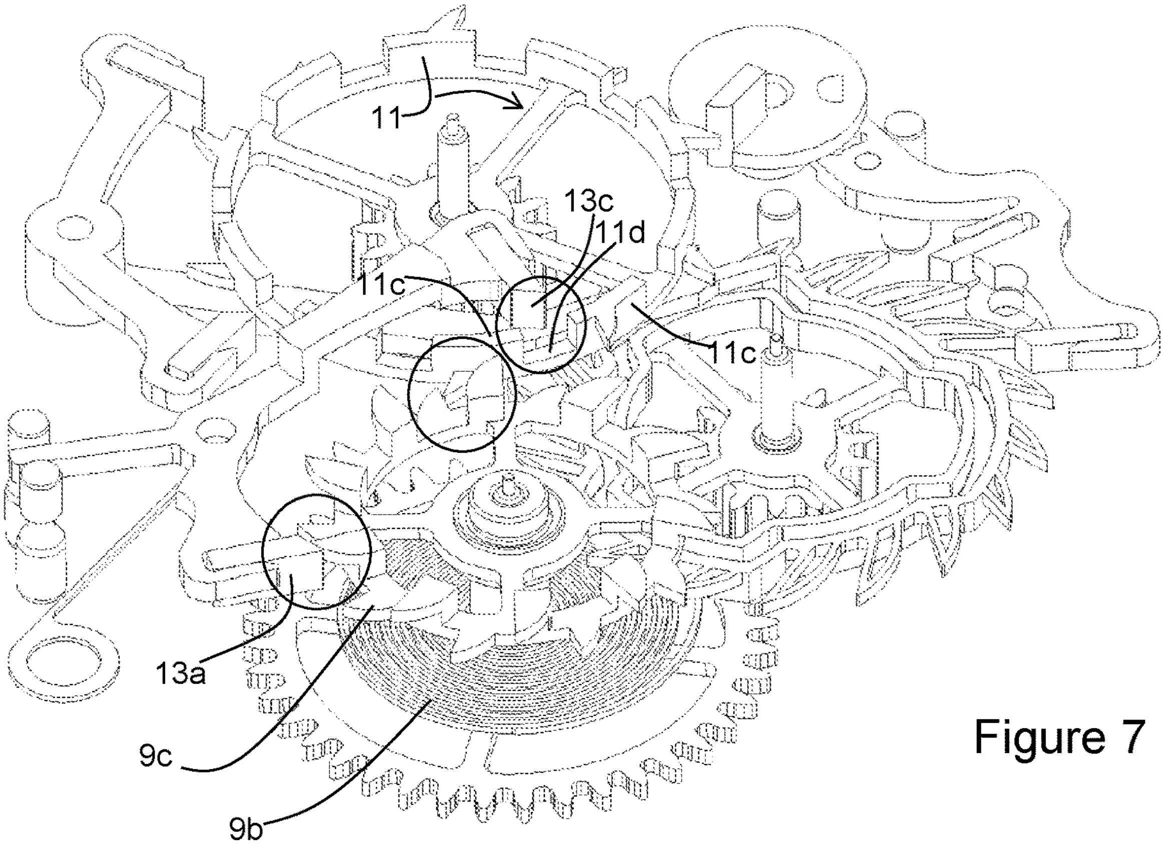

FIG. 7 illustrates the state of the components upon the recharging of the recharge wheel 9*c*. The tooth of the impulse wheel 11, which interacts at that moment with the recharge wheel 9*c*, pivots the latter in the counter-clockwise direction (relative to FIG. 7), which winds the elastic element 9*b*. During this driving, the curved face of another tooth of the recharge wheel 9*c* enters into contact with the blocking pallet 13*a*. At that precise moment, the safety pallet 13*c* is facing an interstice 11*d* between two abutments 11*c* of the impulse wheel 11. The oscillator continues its travel and is no longer of concern until the next alternation.

Figure 8:
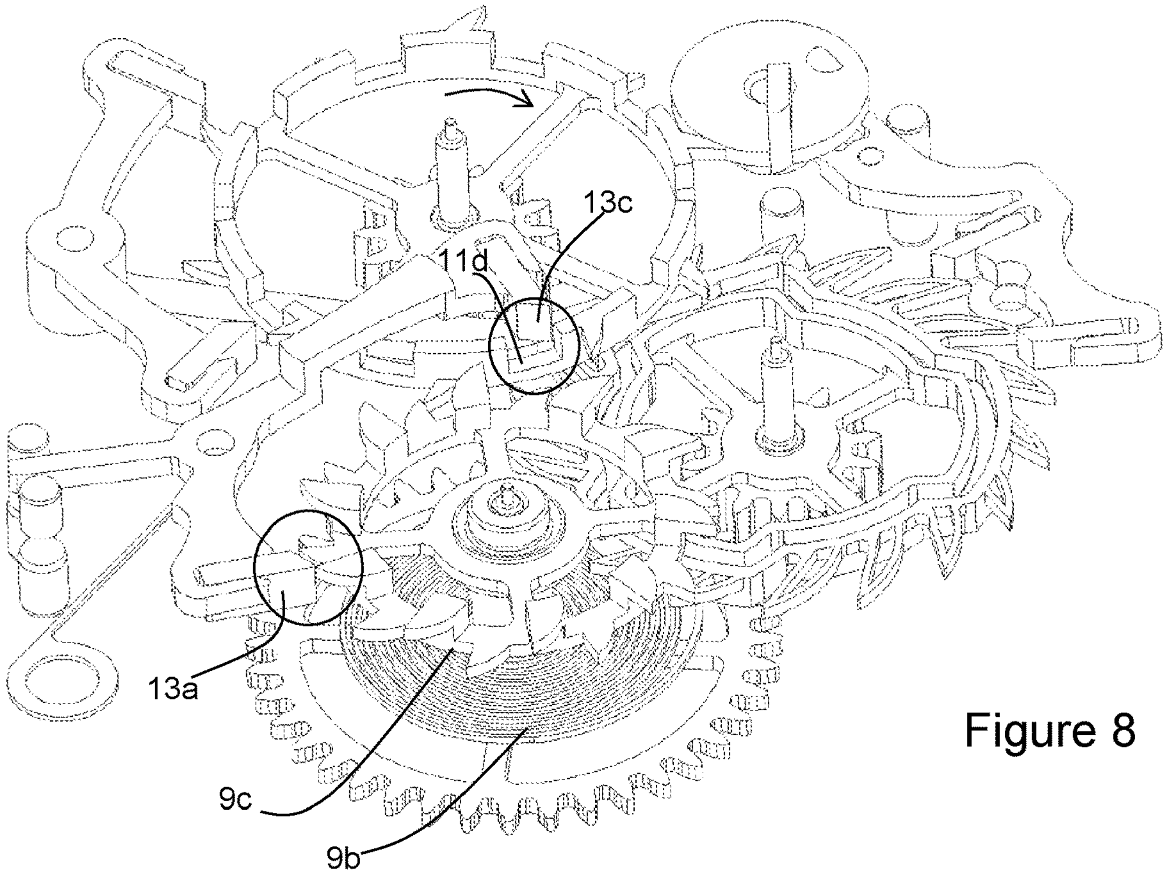

FIG. 8 illustrates the state of the components a few instants after that described in FIG. 7. The blocking pallet 13*a* has reached the top of the tooth of the recharge wheel 9*c* and the safety pallet 13*c* has entered into the interstice 11*d*, which allows a sufficient angular movement on the part of the retention lever 13 to perform this operation.

Figure 9:
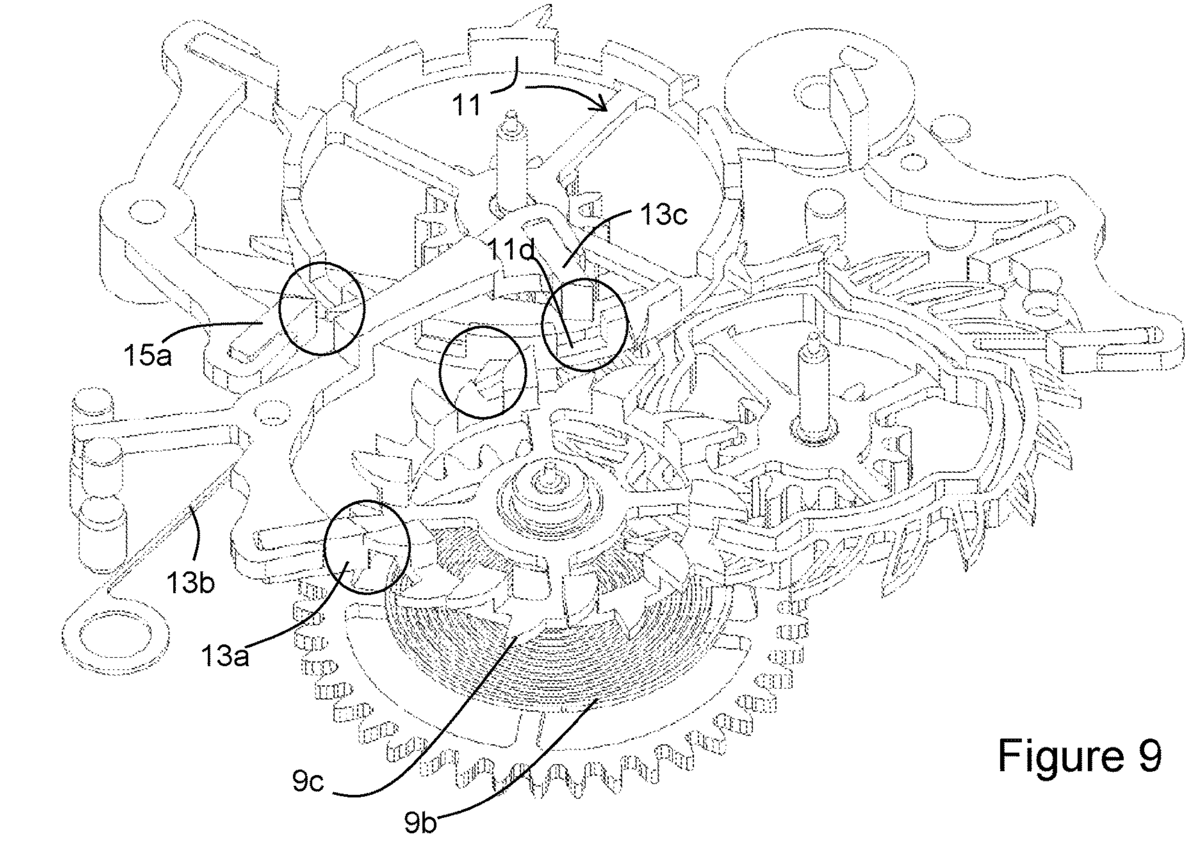

FIG. 9 illustrates the situation once the blocking pallet 13*a* has gone past the top of the tooth of the recharge wheel 9*c*. The blocking pallet 13*a* and the retention lever 13, to which it is secured, drop back into their initial position under the effect of their return spring 13*b*. In that way, the safety pallet 13*c* leaves the interstice 11*d* and the blocking pallet 13*a* blocks the straight face of the next tooth of the recharge wheel 9*c*, stopping it once again. The impulse wheel 11 remains free for the moment, and therefore continues to pivot in the clockwise direction (relative to FIG. 9).

Figure 10:
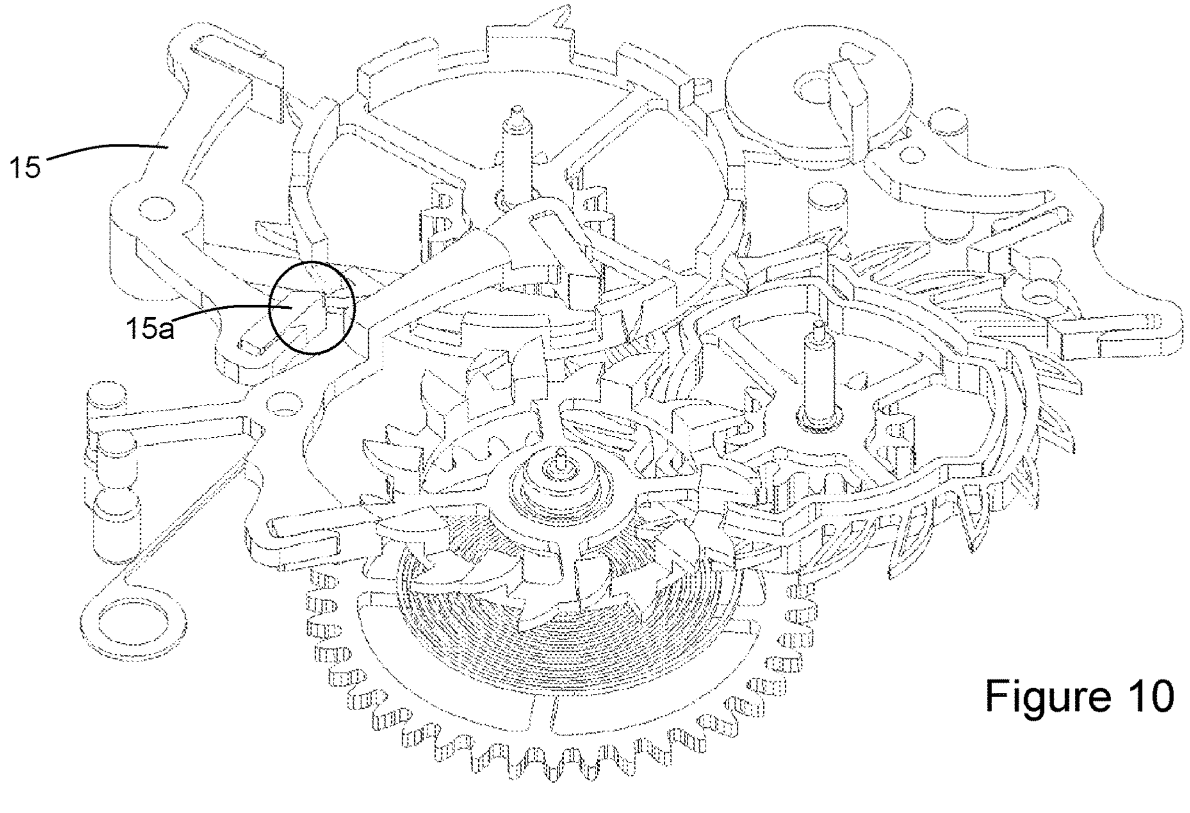

FIG. 10 illustrates the end of this phase of rotation of the impulse wheel 11, one of its teeth having entered into contact once again with the entry pallet 15*a* of the second blocking lever 15.

Six alternations of the oscillator later, the same impulse and recharging cycle is repeated, the second blocking lever 15 switching over from its second angular position, as illustrated in FIG. 10, to its first angular position, as illustrated in FIG. 1, when the cam follower 15*c* performs the transition from the section with greater radius to the section with smaller radius of the cam track 7*b*. The system is thus restored to its starting position and the entire cycle is repeated.

It is thus clear that, by modifying the form of the cam track 7*b*, the constructor can modify the number of lost beats of the escapement. He can even arrange the escapement to give impulses asymmetrically, that is to say that the number of alternations counted can vary, for example according to a sequence of four alternations, then six alternations, then four alternations, then six alternations, by acting on the respective angular lengths of the sections with smaller radius 7*c* and greater radius 7*d*.

Figure 11:
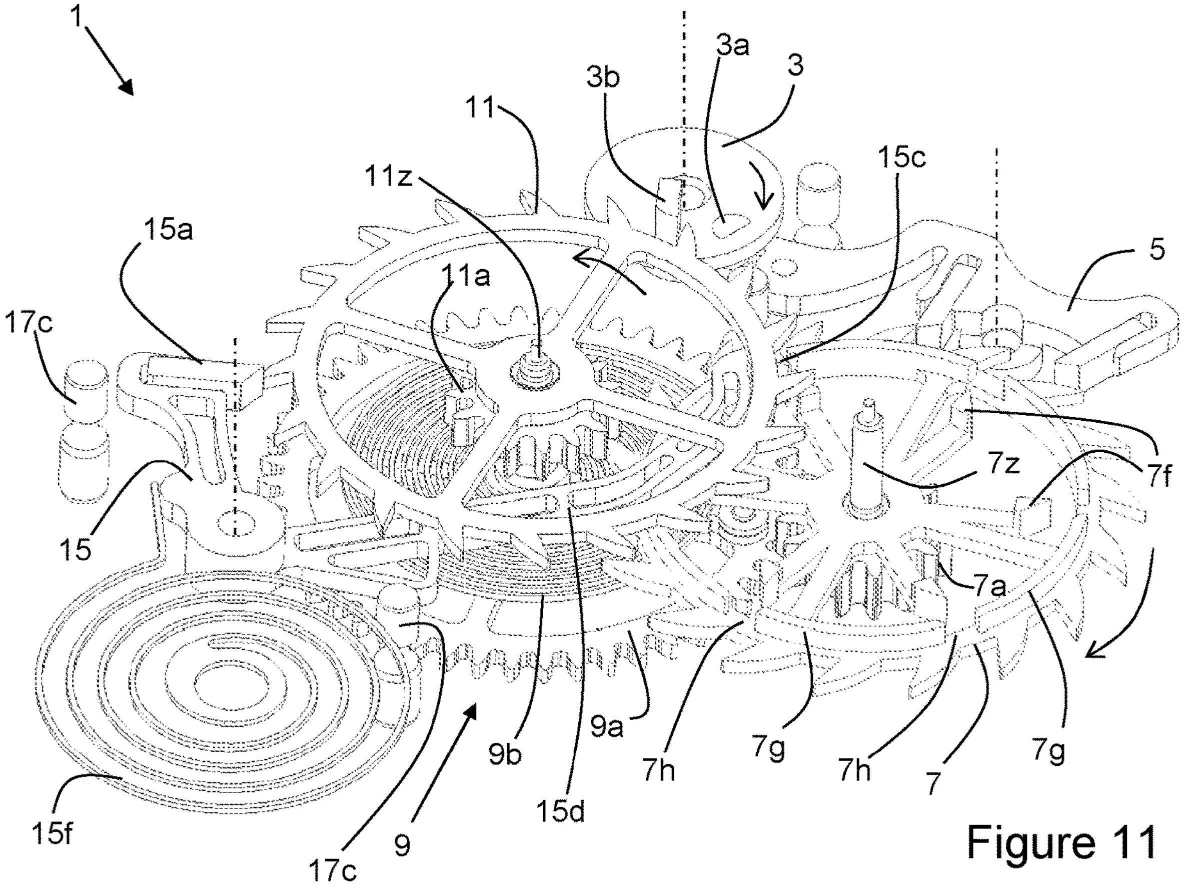
FIGS. 11 to 13 are isometric representations from different angles of a second embodiment of an escapement according to the invention, just before the releasing of the counting wheel.
Figure 12:
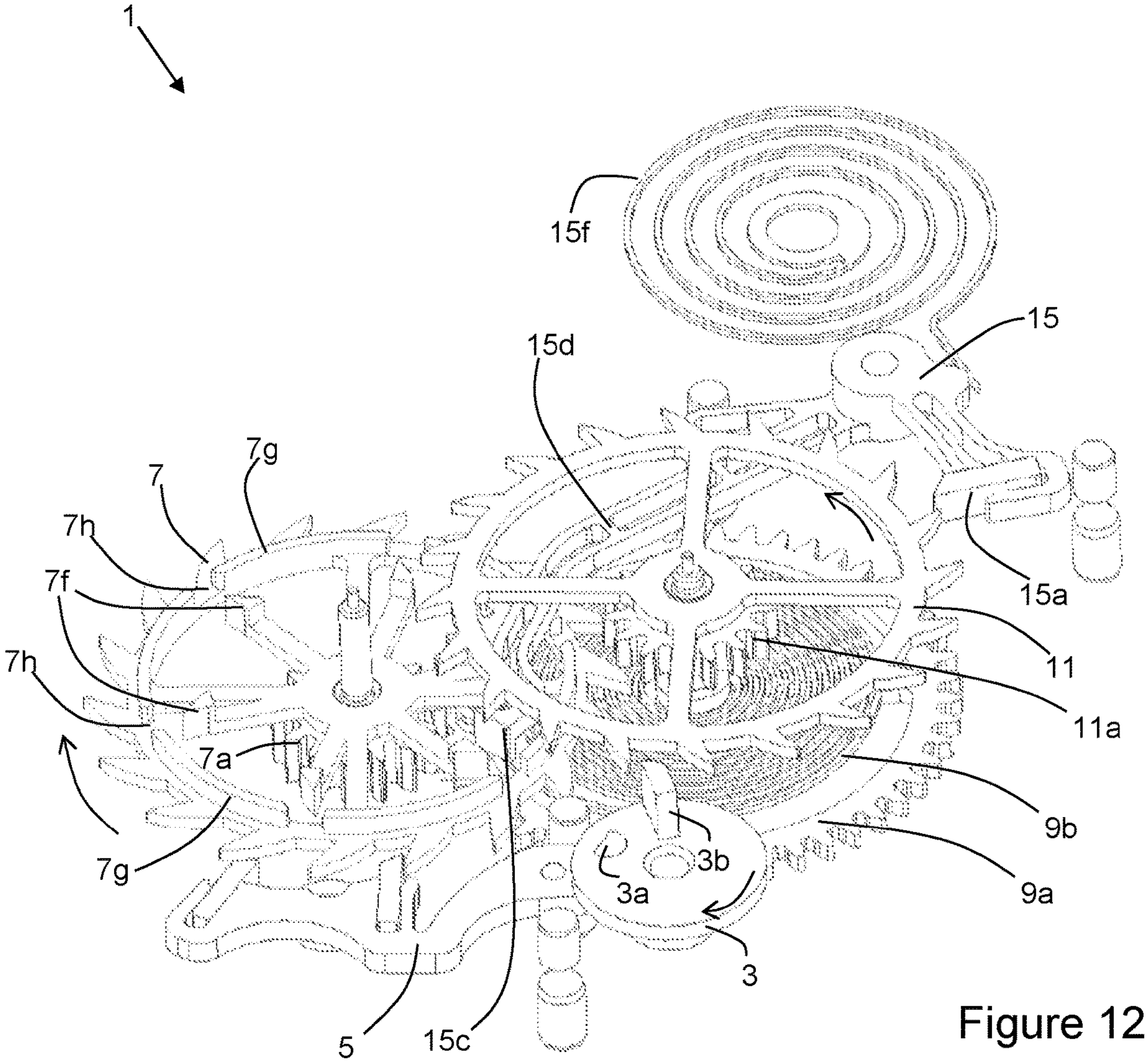
Figure 13:
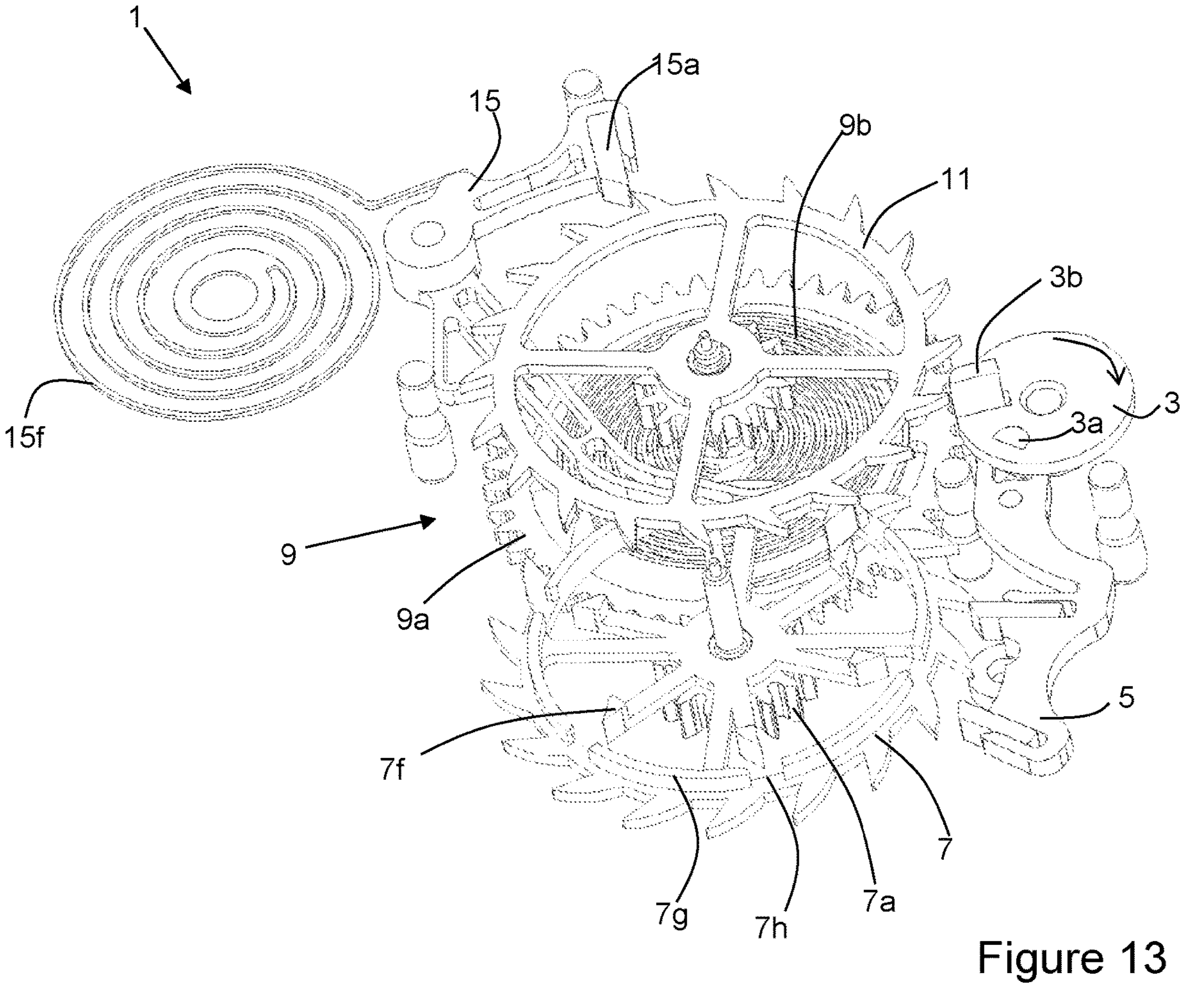

FIGS. 11 to 13 illustrate a second embodiment of an escapement mechanism 1 according to the invention, from several angles. The principle of operation of this embodiment remains substantially similar to that of the embodiment of FIGS. 1 to 10 and consequently only the structural and functional differences will be described below.

The second blocking lever 15 of this embodiment reverts to the form of a detent instead of an anchor and, to this end, comprises only a single blocking pallet 15*a*. The latter is kept engaged with the impulse wheel 11 by means of an elastic return element 15*f*, of which one of the ends is fixed to a frame element (not illustrated), the other exerting a force on the lever 15. The extreme angular positions of the latter are once again defined by suitable abutments 17*c*. The impulse wheel 11, which comprises only a single row of teeth arranged in a single plane, is arranged to pivot in the counter-clockwise direction (relative to FIG. 11), but modifications to make it rotate in the other direction are within the scope of the person skilled in the art.

The second blocking lever 15 is actuated by a plurality of cams 7*f*, rotationally secured to the counting wheel 7, which are arranged to lift the cam follower 15*c*, which is borne once again by an arm 15*d* of the second blocking lever 15, and is formed as the extension thereof in the direction of the counting wheel 7. Once per n alternations (n being six here), one of the cams 7*f*, which here take the form of a plurality of individual teeth, lifts the second blocking lever 15, which allows a tooth of the impulse wheel 11 to escape. The second blocking lever 15 immediately drops back under the effect of its elastic element 15*f* and the rotation of the impulse wheel 11, by one step, provides an impulse to the impulse pallet 3*b* in the clockwise direction (relative to FIG. 11), via another of its teeth. Then, the pallet 15*a* blocks the impulse wheel 11 once again.

In order to ensure that the second blocking lever 15 is not lifted accidentally following a shock, the counting wheel 7 is provided with a plurality of abutments 7*g* protruding from the felloe of the counting wheel 7, these abutments 7*g* being separated by interstices 7*h*. Once again, these abutments 7*g* extend parallel to the axis of rotation of the counting wheel 7. When the cam follower 15*c* is not facing an interstice 7*h*, it is blocked by one of the abutments 7*g* and the impulse wheel 11 can thus not be released. By contrast, when the cam follower 15*c* cooperates with one of the cams 7*f* of the counting wheel 7 to move the second blocking lever 15 in order to release the impulse wheel 11, said follower 15*c* is facing an interstice 7*h* between two adjacent abutments 7*g*, as shown more clearly by FIG. 12. Because of this, the cam follower 15*c* is not blocked by the abutments 7*g* and the second blocking lever 15 is free to pivot sufficiently to release the impulse wheel 11 and thus trigger an impulse.

In this embodiment, the recharge assembly 9 is simplified and mounted coaxial with the impulse wheel. To this end, the internal end of the elastic element 9*b* is rotationally secured to the impulse wheel 11, and there is no recharge wheel. Consequently, each time the impulse wheel 11 is released by the second blocking lever 15, the elastic element 9*b* is simply rewound by the rotation of the axis of the latter.

The cycle of operation of this embodiment therefore proceeds in a way similar to that of the embodiment of FIGS. 1 to 10, *mutatis mutandis.*

FIGS. 14 to 21 illustrate another embodiment of an escapement mechanism 1 according to the invention. Once again, not all of the reference signs appear in each figure. This embodiment will be explained with reference to its differences with respect to that of FIGS. 11 to 13, with which it presents the greatest similarities, notably in view of the fact that the impulse wheel 11 is coaxial to the wheel 9*a* of the recharge assembly 9 and the second blocking lever 15 once again takes the form of a detent having a single pallet 15*a*. The return force of the second blocking lever 15 is supplied by a leaf spring 15*f*, but other forms are possible.

However, in this embodiment, the second blocking lever 15 is not controlled directly by the cam track 7*b* rotationally secured to the counting wheel 7, but indirectly through an actuation lever 19, mounted to translate and pivot on a frame element that is not represented. This pivoting will be described below in the context of FIG. 17 and is limited by conventional abutments 17*a*.

The actuation lever 19 comprises an end 19*a*, which is linked to the main body of said lever 19 via a blade 19*f* which has a certain flexibility, said end 19*a* being arranged to cooperate with an actuation pallet 3*d* secured to the table roller 3. The latter can take the form of a conventional pallet, a pin, a finger or any equivalent form. It can be monobloc with the table roller 3 or can be an element added to the latter. In the state represented in FIG. 14, just before the first releasing of the counting wheel 7 at the start of an operating cycle, the actuation lever 19 is in an inactive position and its end 19*a* is out of reach of the actuation pallet 3*d* and therefore has no effect during the oscillations of the oscillator. It should also be noted that said end 19*a* is in a plane different from that of the impulse wheel 11, and this point will be returned to later.

Figure 22:
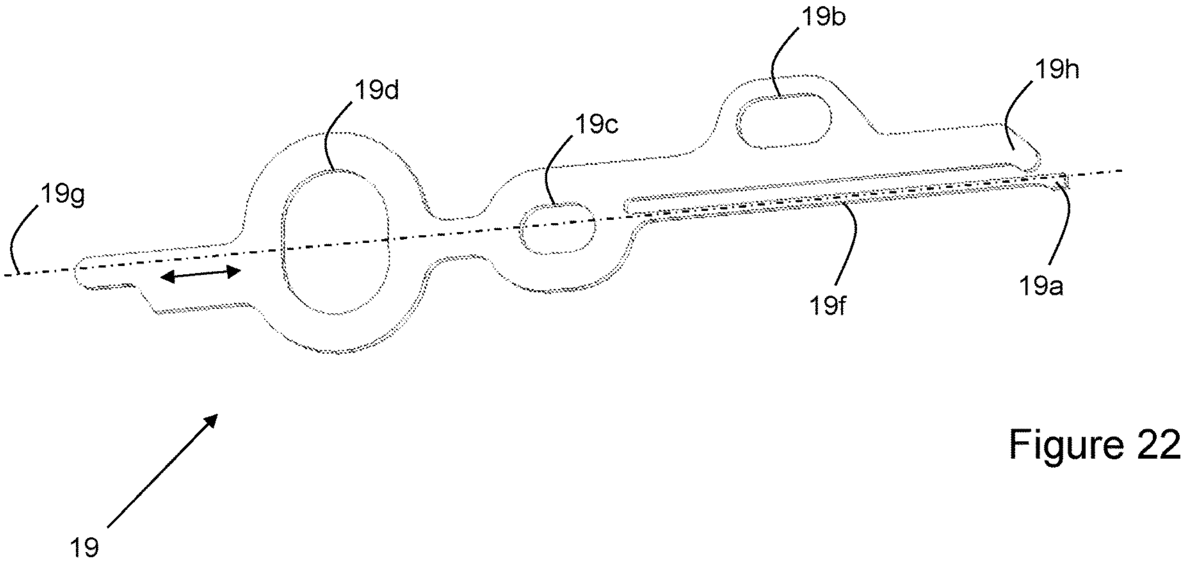
FIG. 22 is an isometric representation of the actuation lever of the third embodiment.

The translation of the actuation lever 19 is controlled by a control lever 21, mounted to pivot on a frame element (not represented). A first end of this lever 21 bears a cam follower 21*a* which takes place in said cam track 7*b*, the other end 21*b* being arranged to move the actuation lever 19 in translation in a direction substantially following the main axis thereof. To this end, the control lever 21 bears a stud 21*c* which sits with play in a slit 19*d* in the actuation lever, this slit 19*d* extending substantially at right angles to said direction and to the main axis 19*g* of said lever 19 (see FIG. 22). Other configurations are of course possible. A screw 21*d*, visible exclusively in FIGS. 14 and 20, ensures that the control lever 21 and the actuation lever do not separate from each another.

The cam track 7*b* is conformed in such a way that, upon the four alternations of the balance which follow, the follower 21*a* remains in a section with greater radius 7*d* of said cam track 7*b*. That way, the actuation lever 19 remains in its retracted position and its end does not cooperate with the actuation pallet.

Figure 15:
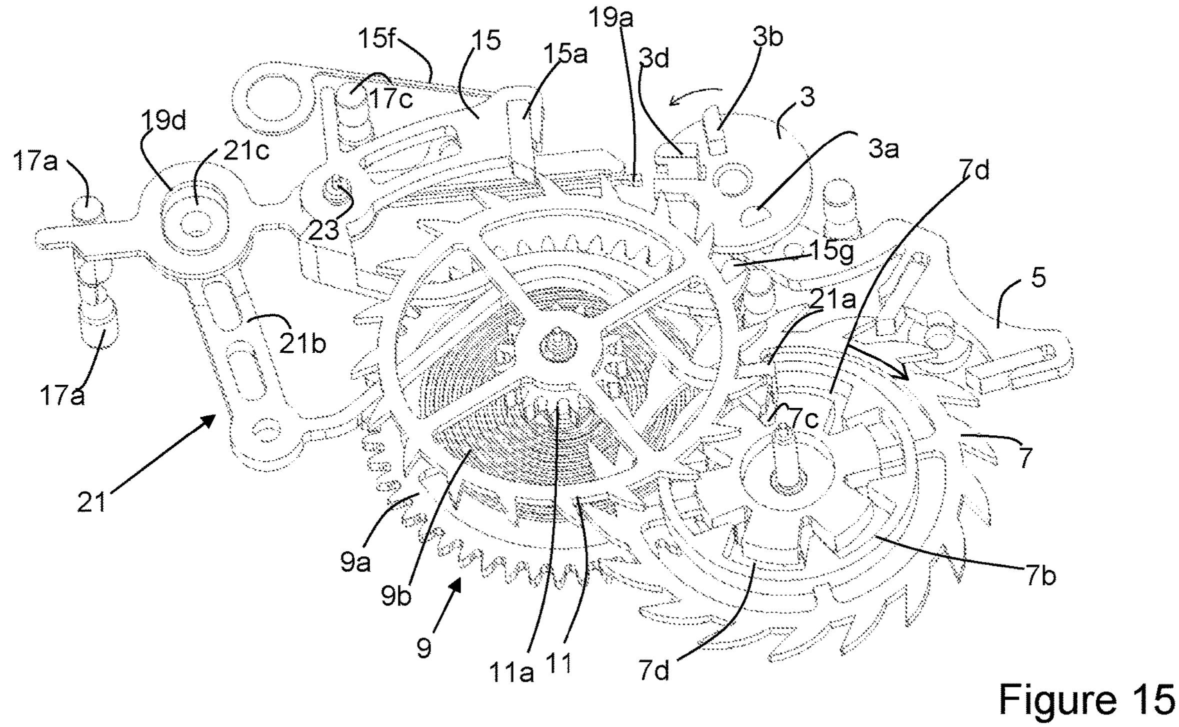

FIG. 15 illustrates the situation just before the releasing of the counting wheel 7 upon the fifth alternation, at which moment the cam follower 21*a* has reached the end of a section with greater radius 7*d* of the cam track 7*b*

The table roller 3 continues to pivot in the counter-clockwise direction (relative to FIG. 15), lifts the first blocking lever 5 and releases the counting wheel 7, which advances by one half-step under the effect of the elastic element 9*b* as discussed above in the context of the other embodiments.

Figure 16:
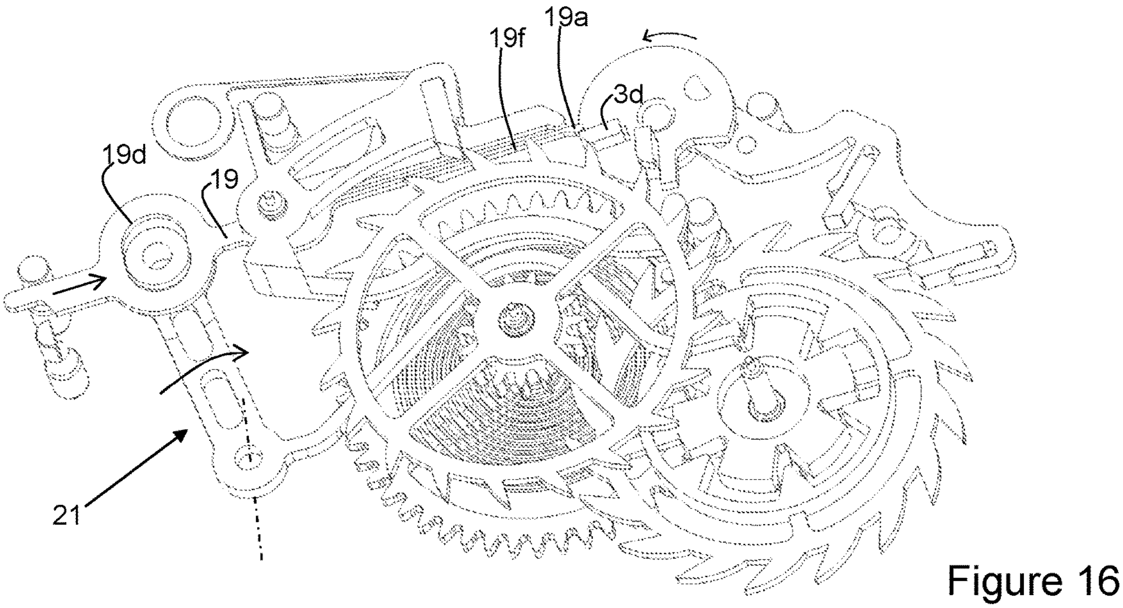
Figure 17:
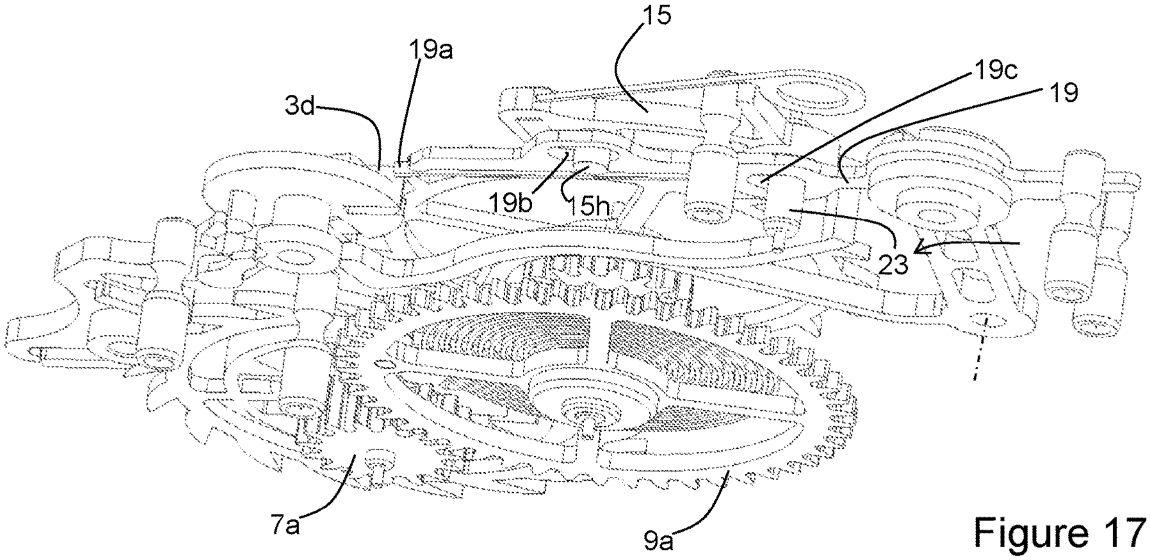

FIGS. 16 and 17 illustrate, in two views, the state of the mechanism towards the end of said fifth alternation, the cam follower 21*a* having followed the cam track 7*b* to the bottom of a section with smaller radius 7*c*. In so doing, the control lever 21 has pivoted in the clockwise direction (according to the orientation of FIG. 16), which has generated a translation of the actuation lever 19 toward the table roller 3, as indicated by the arrows. The actuation pallet 3*d* lifts the end 19*a* of said lever 19, with no effect on the angular position of the body thereof, by virtue of the elasticity of the blade 19*f* which allows the end 19*a* to be separated when the actuation pallet 3*d* circulates in the counter-clockwise direction (also according to the orientation of FIG. 16). In addition, it should be noted that this separation of the end 19*a* can occur in different directions, depending on the configuration and the form of the components of the "actuation pallet—actuation lever—blade" system, notably parallel to the axis of rotation of the table roller, radially or even a combination of the two. Modifications to the mechanism to allow separations in these other directions are within the reach of the person skilled in the art and should not therefore be described in detail here.

In order for said translation to be substantially rectilinear, the actuation lever 19 is guided by its two slits 19*b*, 19*c*, which extend substantially parallel to the main axis 19*g* (see FIG. 20) of the actuation lever 19. The first slit 19*b* houses a pin 15*h* which is secured to the second blocking lever 15 at a point away from its axis of rotation. The second slit 19*c* contains a stud 23 which is secured to a frame element and which serves as pivoting axis for the second blocking lever 15. Consequently, when the control lever 21 pivots as described previously, the actuation lever 19 is moved in translation in such a way that its end 19*a* comes within the reach of the actuation pallet 3*d*. The actuation lever 19 is thus in an active position, in which it can cooperate with the actuation pallet 3*d* to trigger the impulse as will be described below.

The current alternation continues, the table roller 3 continuing its travel in the counter-clockwise direction (relative to FIG. 16).

Figure 14:
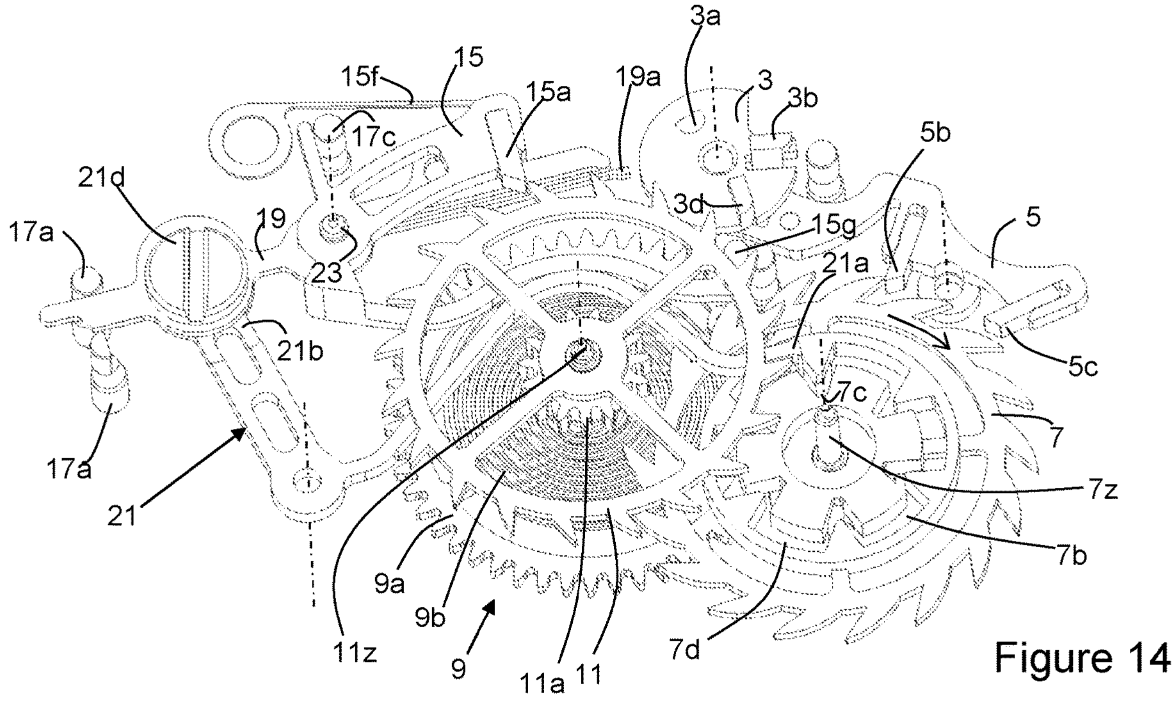
FIGS. 14 to 21 are isometric representations from different angles of a third embodiment of an escapement according to the invention, in several operating states.
Figure 18:
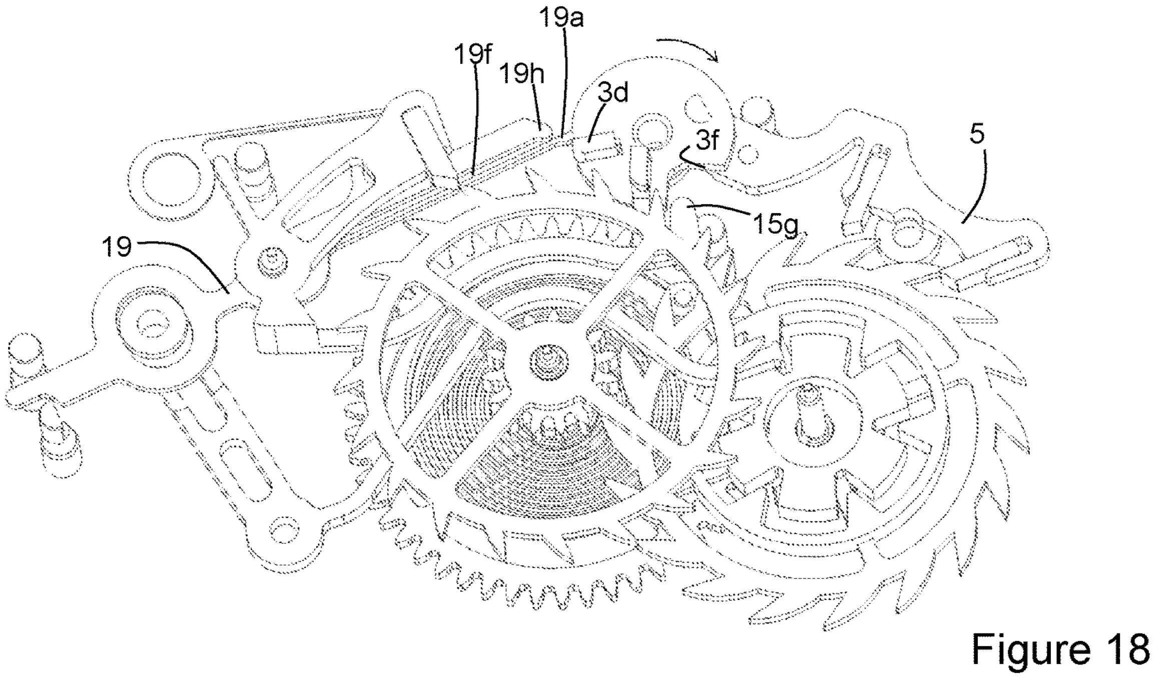

Upon the next alternation, that is to say the sixth from the situation illustration in FIG. 14, the actuation pallet 3*d*, circulating in the counter-clockwise direction (relative to FIG. 16) enters into contact with the end 19*a* of the actuation lever 19, as illustrated in FIG. 18. The interaction between the actuation pallet 3*d* and the actuation lever 19 is performed before the roller pin 3*a* modifies the angular position of the first blocking lever 5. Since the end 19*a* is linked to the main body of the actuation lever 19 via the flexible blade 191, the lever 19 also comprises a abutment 19*h*, substantially rigid, against which the ends 19*a* and/or the blade 19*f* abuts in order for the actuation pallet 3*d* to be able to act on the angular position of all of the actuation lever 19 when it circulates in the clockwise direction relative to FIG. 16 (but not in the other direction as mentioned above).

Figure 19:
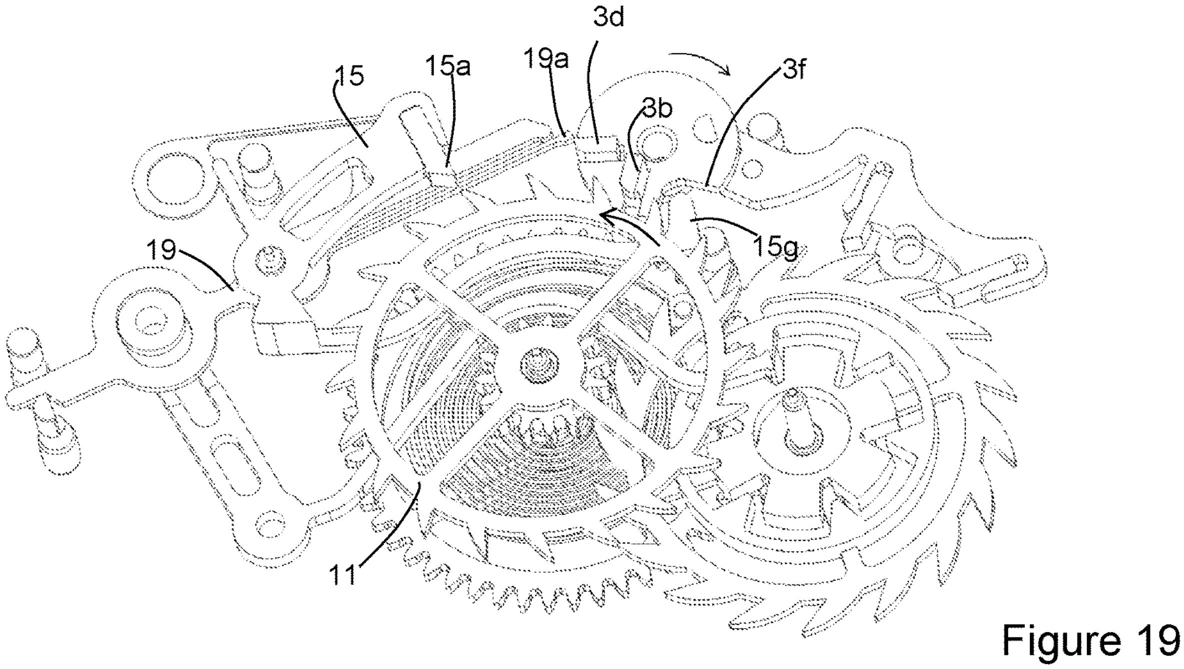

As illustrated in FIG. 19, the actuation pallet 3*d* lifts the end 19*a* of the actuation lever 19, which lifts the second blocking lever 15 by virtue of the interaction between the first slit 19*b* and the pin 15*h* (see FIG. 17).

The impulse wheel 11 is thus released, the impulse is triggered and one of the teeth of the impulse wheel 11 gives an impulse to the impulse pallet 3*b* in the counter-clockwise direction (relative to FIG. 19) under the effect of the torque coming from the power source (not illustrated) as described above in the context of the other embodiments.

Figure 20:
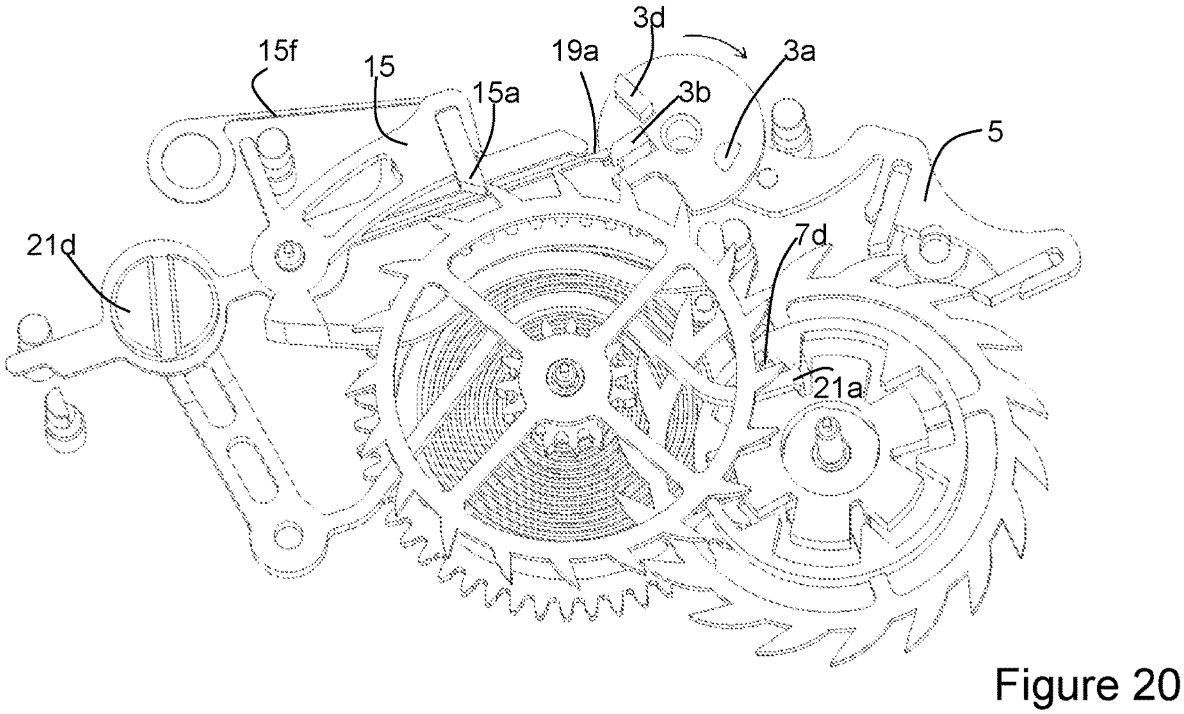
Figure 21:
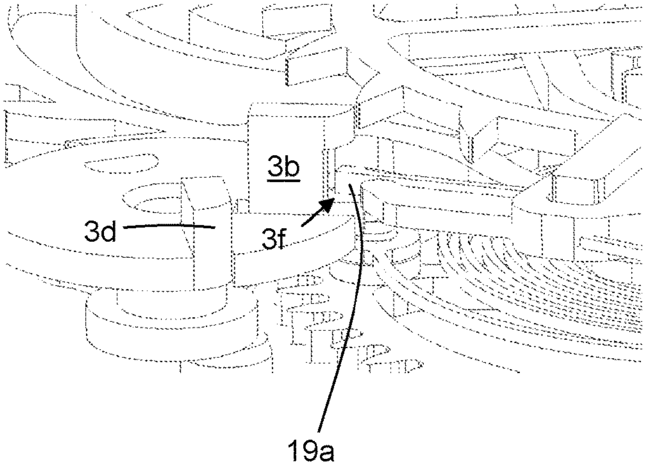

When the actuation pallet 3*d* goes beyond the end 19*a* and consequently releases the actuation lever 19, the latter and the second blocking lever 15 drop back under the effect of the elastic element 15*f*, the blocking pallet 15*a* stopping and blocking the next tooth of the impulse wheel. This situation is illustrated in FIG. 20.

Since the control lever 21 is again in the position of FIGS. 16 to 19, the actuation lever 19 is still in its active position. In order to avoid having the impulse pallet 3*b* abut against the end 19*a* of said lever 19, which would stop the oscillator, said pallet 3*b* comprises a cutout 3*f* which avoids any contact between these two elements, the interaction between the impulse wheel 11 and said pallet 3*b* being performed in a plane different from that of said cutout 3*f*.

Then, the roller pin 3*a* drives the first blocking lever 5 in the counter-clockwise direction (relative to FIG. 20), which releases and advances the counting wheel 7 by one half-step, the cam follower 21*a* rises up towards the next section with greater radius 7*d*. In so doing, the control lever 21 pivots in the counter-clockwise direction (relative to FIG. 20), thus retracting the actuation lever 19 so that its end 19*a* is no longer within the reach of the actuation pallet 3*d* and the mechanism is thus once again in the situation illustrated in FIG. 14. The operating cycle can thus recommence.

By these means, the counting wheel 7 once again controls the periodic releasing of the impulse wheel 11, even though the latter is triggered by the actuation pallet 3*d*. In other words, the position of the actuation lever 19 is controlled by the counting wheel 7 via the control lever 21 the active position of the actuation lever 19 allowing the triggering of the impulse.

In order to avoid the actuation lever 19 moving in case of shock and having it start rotating and/or translating—although it should not be in the zone of passage of the actuation pallet 3*d* (between the sixth and the fourth next alternation)—abutments 17*a* are provided in order to avoid an accidental rotation of this lever: indeed, this would have the effect of lifting the second blocking lever 15 and of releasing the impulse wheel 11 at an unwanted instant.

Furthermore, to avoid having this lever 19 being moved in translation hi said zone, the cam follower 21*a*, located in the cam track 7*b* (therefore having an anti-shock effect), is prevented from moving accidentally.

However, an arrangement of cams similar to that of the embodiment of FIGS. 11 to 13 is also possible, through an appropriate anti-shock arrangement.

Furthermore, between the fifth and sixth alternations, in order for the impulse wheel 11 not to be released accidentally in case of shock, the second blocking lever 15 bears a finger 15*g*, arranged to abut against the perimeter of the table roller 3 when this second blocking lever 15 is not allowed to be lifted. In order to allow the release of the impulse wheel 11, exclusively when the table roller 3 is in the right orientation, a notch 31 is provided in the table roller 3. When the finger 15*g* is facing said notch 3*f* (see FIGS. 18 and 19), the second blocking lever 15 is allowed to be lifted in order to release the impulse wheel 11 in the case where an interaction between the actuation pallet 3*d* and the actuation lever 19 takes place.

Moreover, other arrangements for guiding the actuation lever 19 are of course possible, and the recharge assembly 9 of the embodiment of FIGS. 1 to 10 can also be applied in this embodiment.

The technical effects obtained by these constructions are as follows.

With respect to the first blocking lever 5, the forces generated upon its interaction with the roller pin 3*a* are minimal and are generated "symmetrically". Because of this, the disturbance of the oscillator is minimized and is divided between the alternations in both directions of rotation instead of being concentrated in a single more significant disturbance, once per oscillation.

The fact that the counting wheel 7 is subjected to a torque by means of the elastic element 9*b* means that any use of a jumper or the like is avoided to retain the counting wheel 7, which is simply blocked by the pallets of the first blocking lever 5 in a way similar to a conventional pallet. To this end, a draw angle can be provided for the rest surfaces of the pallets 5*b* and 5*c*, as is known, Because of this, the oscillator does not itself drive the counting wheel 7, as is the case the document CH712052. The oscillator simply triggers the rotation of the counting wheel 7 under the effect of the elastic element 9*b*. It goes without saying that such triggering requires significantly less force than a direct drive overcoming the effect of a jumper, and consequently the disturbances of the oscillator are minimized.

Since the counting wheel 7 is driven by the elastic element 9*b* which is recharged on each step of the impulse wheel 11, said torque remains relatively constant and the resistance to disengagement of the first blocking lever 5 remains also substantially constant and does not vary according to the state of winding of the barrel spring of the movement in which the escapement 1 is incorporated.

Since the efficiency of this escapement 1 is very good, it is possible to increase the number of lost beats of the escapement 1, that is to say by supplying an impulse only once every two or three (or even more) oscillations, the power reserve of the movement being thus enhanced by comparison to a conventional escapement since the impulse wheel 11 pivots less frequently. In addition, the disturbances of the oscillator due to the impulses are also reduced by reducing the impulse frequency, which increases the isochronism of the oscillator.

It will also be noted that the escapement mechanism 1 according to the invention, in all its variants, is compatible with incorporation in a tourbillon system with one, two or three axes of rotation.

With respect to the materials which can be used to produce the various components of the escapement mechanism 1, the latter can be composed of "traditional" materials, such as metals and alloys (steel, brass, nickel, nickel phosphorus, etc.), materials based on silicon (Si, SiOx, SiCx, SiNx, etc.) in monocrystalline, polycrystalline or amorphous form, diamond, ruby, sapphire, corundum, glass, ceramics, ceramic glasses, polymers, composites, etc. The components can be machined conventionally, but can also be obtained by additive technologies such as LIGA, sintering, 3D printing, etc. using various materials (for example epoxy or other polymer material), depending on the material. Furthermore, coatings of different substances can be provided at the points that are stressed in order to reinforce their resistance, reduced frictions, or the like (diamond, etc.).

Although the invention has been particularly shown and described in reference to particular embodiments, other variants are possible without departing from the framework of the invention as defined in the claims.

For example, in considering the embodiment of FIGS. 11 to 13, the second blocking lever 15 can take the form of an anchor, like that of FIGS. 1 to 10, the cams 7*f* being replaced by a conventional cam or a cam track like that of FIGS. 1 to 10. The use of a cam track for the actuation of a second blocking lever in the form of an anchor will make it possible to eliminate the abutments 7*g* on the counting wheel 7 since such an arrangement is shock-resistant.

Alternatively, the person skilled in the art can modify the arrangement of FIGS. 1 to 10 in such a way that the second blocking lever 15 comprises only a single blocking pallet and it acts thus as detent.

Moreover, in the case where the escapement mechanism 1 is incorporated in a clock and is not subjected to shocks, the abutments 11*c*, respectively 7*g*, can be eliminated, the safety pallet 13*c* of the embodiment of FIGS. 1 to 10 being also able to be eliminated.

We claim:

1. An escapement mechanism for a timepiece, intended to cooperate with an oscillator arranged to perform oscillations, said mechanism comprising:

a counting wheel arranged to advance in rotation by steps in function of the oscillations of said oscillator;

an impulse wheel intended to be kinematically linked with a motive source, said impulse wheel being arranged to be blocked and released periodically under the control of said counting wheel and to supply impulses to said oscillator;

wherein:

when said escapement mechanism is operating, said counting wheel is permanently subjected to a torque;

said counting wheel is arranged to advance in rotation by a half-step of its toothing for each alternation of said oscillator, wherein said impulse wheel and said counting wheel are each pivoted on a respective rotation axis, these said axes being distinct from one another.

2. The mechanism as claimed in claim 1, further comprising a first blocking lever arranged to move between a first angular position and a second angular position upon a first alternation of said oscillator, and to move between said second angular position and said first angular position upon a second alternation of said oscillator, said blocking lever being arranged to block the rotation of said counting wheel and to release the latter at a rate of one half-step of its toothing upon each of said movements of said first blocking lever.

3. The mechanism as claimed in claim 2, further comprising a second blocking lever arranged to block and to release said impulse wheel in function of the rotation of said counting wheel.

4. The mechanism as claimed in claim 3, wherein said second blocking lever is arranged to release said impulse wheel at a rate of one step on each n alternations of said oscillator, n being a number greater than two.

5. The mechanism as claimed in claim 3, wherein said second blocking lever comprises a cam follower arranged to cooperate with at least one cam or at least one cam track rotationally secured to said counting wheel.

6. The mechanism as claimed in claim 3, wherein said second blocking lever comprises at least one pallet arranged to block and to release said impulse wheel.

7. The mechanism as claimed in claim 3, wherein said second blocking lever comprises a single pallet arranged to block and to release said impulse wheel, said second blocking lever being arranged to be lifted by an actuation lever in order to release said impulse wheel, said actuation lever being arranged to move in translation between a retracted position in which said actuation lever is out of reach of an actuation pallet rotationally secured to said oscillator, and an active positioning in which said actuation lever can cooperate with said actuation pallet to lift said second blocking lever, the state of said actuation lever being determined in function of the angular position of said counting wheel.

8. The mechanism as claimed in the claim 7, wherein said actuation lever is arranged to move between said active position and said retracted position under the effect of a control lever bearing a cam follower arranged to cooperate with a cam track or cams rotationally secured to said counting wheel.

9. The mechanism as claimed in claim 1, wherein said torque, to which said counting wheel is subjected, is supplied via an elastic element arranged to be wound by said impulse wheel.

10. The mechanism as claimed in claim 9, wherein said elastic element forms part of a recharge assembly comprising a recharge assembly wheel kinematically linked with said counting wheel.

11. The mechanism as claimed in claim 10, wherein a first end of said elastic element is fixed to said wheel and a second end of said elastic element is rotationally secured to a recharge wheel arranged to be driven in rotation by a toothing of said impulse wheel.

12. The mechanism as claimed in claim 11, wherein said recharge wheel is arranged to be retained by a retention lever arranged to block a rotation of said recharge wheel in a first direction and to be lifted by a tooth of said recharge wheel when the latter pivots in a second direction opposite to said first direction.

13. The mechanism as claimed in claim 12, wherein said retention lever is arranged to cooperate with a plurality of abutments provided on said impulse wheel, said abutments being arranged to prevent said retention lever from disengaging, except when said recharge wheel is being driven by said impulse wheel.

14. The mechanism as claimed in claim 13, wherein said impulse wheel and said recharge wheel each comprise a plurality of teeth distributed between at least two different planes.

15. The mechanism as claimed in claim 9, wherein a first end of said elastic element is rotationally secured to said impulse wheel, a second end of said elastic element being rotationally secured to a wheel kinematically linked with said counting wheel.

16. The mechanism as claimed in claim 15, further comprising a first blocking lever arranged to move between a first angular position and a second angular position upon a first alternation of said oscillator, and to move between said second angular position and said first angular position upon a second alternation of said oscillator, said blocking lever being arranged to block the rotation of said counting wheel and to release the latter at a rate of one half-step of its toothing upon each of said movements of said first blocking lever, wherein said second blocking lever comprises at least one pallet arranged to block and to release said impulse wheel, and wherein said second blocking lever comprises a single blocking pallet arranged to block the impulse wheel and a cam follower arranged to cooperate with at least one cam comprised by said counting wheel, said counting wheel comprising a plurality of abutments arranged to prevent said second blocking lever from releasing said impulse wheel, except when said cam follower is being actuated by said at least one cam.

17. A timepiece movement comprising the mechanism as claimed in claim 1 and an oscillator arranged to cooperate with said mechanism.

18. A timepiece comprising the movement as claimed in claim 17.

19. An escapement mechanism for a timepiece, intended to cooperate with an oscillator arranged to perform oscillations, said mechanism comprising:

a counting wheel arranged to advance in rotation by steps in function of the oscillations of said oscillator;

an impulse wheel intended to be kinematically linked with a motive source, said impulse wheel being arranged to be blocked and released periodically under the control of said counting wheel and to supply impulses to said oscillator;

wherein:

when said escapement mechanism is operating, said counting wheel is permanently subjected to a torque;

said counting wheel is arranged to advance in rotation by a half-step of its toothing for each alternation of said oscillator, wherein said torque, to which said counting wheel is subjected, is supplied via an elastic element arranged to be wound by said impulse wheel, wherein said elastic element forms part of a recharge assembly comprising a recharge assembly wheel kinematically linked with said counting wheel, and wherein a first end of said elastic element is fixed to said wheel and a second end of said elastic element is rotationally secured to a recharge wheel arranged to be driven in rotation by a toothing of said impulse wheel.

20. An escapement mechanism for a timepiece, intended to cooperate with an oscillator arranged to perform oscillations, said mechanism comprising:

a counting wheel arranged to advance in rotation by steps in function of the oscillations of said oscillator;

an impulse wheel intended to be kinematically linked with a motive source, said impulse wheel being arranged to be blocked and released periodically under the control of said counting wheel and to supply impulses to said oscillator;

wherein:

when said escapement mechanism is operating, said counting wheel is permanently subjected to a torque;

said counting wheel is arranged to advance in rotation by a half-step of its toothing for each alternation of said oscillator, wherein said torque, to which said counting wheel is subjected, is supplied via an elastic element arranged to be wound by said impulse wheel, and wherein a first end of said elastic element is rotationally secured to said impulse wheel, a second end of said elastic element being rotationally secured to a wheel kinematically linked with said counting wheel.

* * * * *